United States Patent
Shibuya et al.

(10) Patent No.: US 8,754,315 B2
(45) Date of Patent: *Jun. 17, 2014

(54) MUSIC SEARCH APPARATUS AND METHOD, PROGRAM, AND RECORDING MEDIUM

(75) Inventors: Takashi Shibuya, Tokyo (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 13/445,027

(22) Filed: Apr. 12, 2012

(65) Prior Publication Data

US 2012/0266743 A1 Oct. 25, 2012

(30) Foreign Application Priority Data

Apr. 19, 2011 (JP) ................................. 2011-092987

(51) Int. Cl.
*G10H 1/00* (2006.01)

(52) U.S. Cl.
USPC ................................. 84/600; 84/602; 700/94

(58) Field of Classification Search
USPC ...................................... 84/600–602; 700/94
See application file for complete search history.

(56) References Cited

U.S. PATENT DOCUMENTS

| | | | | |
|---|---|---|---|---|
| 3,481,241 A | * | 12/1969 | Gaillard | 84/474 |
| 5,040,217 A | * | 8/1991 | Brandenburg et al. | 704/200.1 |
| 5,302,777 A | * | 4/1994 | Okuda et al. | 84/637 |
| 7,478,045 B2 | * | 1/2009 | Allamanche et al. | 704/236 |
| 2005/0234366 A1 | * | 10/2005 | Heinz et al. | 600/559 |
| 2007/0162277 A1 | * | 7/2007 | Kurniawati et al. | 704/200.1 |
| 2007/0255562 A1 | * | 11/2007 | Kurniawati et al. | 704/230 |
| 2007/0270987 A1 | * | 11/2007 | Fujii | 700/94 |
| 2007/0293960 A1 | * | 12/2007 | Fujii | 700/94 |
| 2010/0126332 A1 | * | 5/2010 | Kobayashi | 84/613 |
| 2010/0186576 A1 | * | 7/2010 | Kobayashi | 84/612 |
| 2010/0246842 A1 | * | 9/2010 | Kobayashi | 381/61 |
| 2011/0100198 A1 | * | 5/2011 | Gatzsche et al. | 84/615 |
| 2011/0270848 A1 | * | 11/2011 | Bonet et al. | 707/748 |
| 2012/0266742 A1 | * | 10/2012 | Touyama et al. | 84/659 |
| 2012/0266743 A1 | * | 10/2012 | Shibuya et al. | 84/659 |
| 2013/0054252 A1 | * | 2/2013 | Tsai et al. | 704/500 |

FOREIGN PATENT DOCUMENTS

JP 2009-276776 11/2009

OTHER PUBLICATIONS

English-language Extended European Search Report in corresponding EP 12 16 1895, mailed Jul. 25, 2012.

(Continued)

*Primary Examiner* — David S. Warren

(74) *Attorney, Agent, or Firm* — Sony Corporation of America

(57) ABSTRACT

An index calculating unit calculates a tonality index of a signal component of each area of the input signal transformed into a time frequency domain based on intensity of the signal component and a function obtained by approximating the intensity of the signal component. A similarity calculating unit calculates a similarity between a feature quantity in each area of the input signal obtained based on the index and the feature quantity in each area of the reference signal obtained based on the index calculated on the reference signal transformed into the time frequency domain. A music identifying unit identifies music of the input signal based on the similarity. The present technology can be applied to a music search apparatus that identifies music from an input signal.

10 Claims, 21 Drawing Sheets

(56) References Cited

OTHER PUBLICATIONS

Zhang, Tong, et al., "Heueristic Approach for Generic Audio data Segmentation and Annotation" Integrated Media Systems Center and Department of Electrical Engineering-Systems, University of Southern California, pp. 67-76, 1999.

Casey, Michael A., et al. "Content-Based Music Information Retrieval: Current Directions and Future Challenges". Proceedings of the IEEE, vol. 96, No. 4, Apr. 2008, pp. 668-696.

\* cited by examiner

MUSIC SEARCH APPARATUS AND METHOD, PROGRAM, AND RECORDING MEDIUM

BACKGROUND

The present technology relates to a music search apparatus and method, a program, and a recording medium, and more particularly, to a music search apparatus and method, a program, and a recording medium, which are capable of identifying music from an input signal.

In the past, a process of matching a feature quantity of an input signal with a feature quantity of a reference signal which is a candidate of music to be identified has been performed in order to identify music input as an input signal. However, for example, when an audio source of a television program such as a drama is used as an input signal, a noise component (hereinafter referred to simply as "noise") including a non-music signal component such as a conversation, sounds (ambient noise), white noise, pink noise, and sound effects are frequently mixed with a music signal component such as background music (BGM), and a change in a feature quantity of an input signal by such noise affects a matching process result.

In this regard, techniques of performing a matching process using only a component having high reliability using a mask pattern for masking a component having low reliability in a feature quantity of an input signal have been proposed.

Specifically, a plurality of kinds of mask patterns for masking a matrix component corresponding to a predetermined time frequency domain are prepared for a feature matrix representing a feature quantity of an input signal transformed into a signal in a time frequency domain in advance. A matching process between a feature quantity of an input signal and a feature quantity of a plurality of reference signals in a database is performed using all mask patterns. Music of a reference signal from which highest similarity is calculated is identified as music of an input signal (for example, see Japanese Patent Application Laid-Open (JP-A) No. 2009-276776).

SUMMARY

However, it is difficult to estimate a time and a frequency at which noise is superimposed on an input signal, and it is difficult to prepare a mask pattern suitable for an input signal in advance. Thus, in the technique disclosed in JP-A No. 2009-276776, it is difficult to perform an appropriate matching process, and thus it is difficult to identify music from an input signal in which music is mixed with noise with a high degree of accuracy.

Meanwhile, there is a technique of generating a mask pattern such that a component in a time section which is high in average power in an input signal is assumed as a component on which noise other than music is superimposed, and matching is performed using only a feature quantity of a time section which is low in average power in an input signal. According to this technique, although a mask pattern according to an input signal can be generated, a frequency component is not considered in the mask pattern, and the mask pattern is not necessarily a mask pattern suitable for an input signal. Further, as illustrated at the left side of FIG. 1, in an input signal in a time frequency domain, noise Dv from a conversation is included in a music signal component DM. In this case, in this technique, a matching process is performed using only feature quantities of a few sections in areas S1 and S2 where the conversation is interrupted. Thus, it is difficult to identify music from an input signal in which music is mixed with noise with a high degree of accuracy. In order to identify music from an input signal in which music is mixed with noise with a high degree of accuracy, it is desirable to perform a matching process using feature quantities of music signal components Dm in areas S3 and S4 as illustrated on the right side of FIG. 4.

The present technology is made in light of the foregoing, and it is desirable to identify music from an input signal with a high degree of accuracy.

According to an embodiment of the present technology, there is provided a music search apparatus that compares an input signal with a reference signal including only music and identifies music of the input signal, including an index calculating unit that calculates a tonality index of a signal component of each area of the input signal transformed into a time frequency domain based on intensity of the signal component and a function obtained by approximating the intensity of the signal component, a similarity calculating unit that calculates a similarity between a feature quantity in each area of the input signal obtained based on the index and the feature quantity in each area of the reference signal obtained based on the index calculated on the reference signal transformed into the time frequency domain, and a music identifying unit that identifies music of the input signal based on the similarity.

The index calculating unit may include a maximum point detecting unit that detects a point of maximum intensity of the signal component from the input signal of a predetermined time section, and an approximate processing unit that approximates the intensity of the signal component near the maximum point by a template function, and calculate the index based on an error between the intensity of the signal component near the maximum point and the template function.

The index calculating unit may adjust the index according to a curvature of the template function.

The index calculating unit may adjust the index according to a frequency of a maximum point of the template function.

The music search apparatus may further include a weight distribution generating unit that generates a weight distribution on each area of the input signal and the reference signal based on a first feature quantity in each area of the input signal and the first feature quantity in each area of the reference signal, and calculates a first feature quantity similarity between the first feature quantity in each area of the input signal and the first feature quantity in each area of the reference signal. The similarity calculating unit may calculate a similarity between a second feature quantity in each area of the input signal and the second feature quantity in each area of the reference signal based on a weight by the weight distribution and the first feature quantity similarity.

The music search apparatus may further include a first feature quantity calculating unit that calculates a time average amount of the index obtained by filtering the index in a time direction as the first feature quantity, and a second feature quantity calculating unit that calculates a time change amount of the index obtained by filtering the index in a time direction as the second feature quantity.

According to another embodiment of the present technology, a music search method of comparing an input signal with a reference signal including only music and identifying music of the input signal, may include calculating a tonality index of a signal component of each area of the input signal transformed into a time frequency domain based on intensity of the signal component and a function obtained by approximating the intensity of the signal component, calculating a similarity between a feature quantity in each area of the input signal obtained based on the index and the feature quantity in each area of the reference signal obtained based on the index calculated on the reference signal transformed into the time frequency domain, and identifying music of the input signal based on the similarity.

According to another embodiment of the present technology, there is provided a program or a program recorded by a recording medium causing a computer to execute signal processing of comparing an input signal with a reference signal including only music and identifying music of the input signal. The signal processing may include calculating a tonality index of a signal component of each area of the input signal transformed into a time frequency domain based on intensity of the signal component and a function obtained by approximating the intensity of the signal component, calculating a similarity between a feature quantity in each area of the input signal obtained based on the index and the feature quantity in each area of the reference signal obtained based on the index calculated on the reference signal transformed into the time frequency domain, and identifying music of the input signal based on the similarity.

According to another embodiment of the present technology, a tonality index of a signal component of each area of the input signal transformed into a time frequency domain is calculated based on intensity of the signal component and a function obtained by approximating the intensity of the signal component. A similarity between a feature quantity in each area of the input signal obtained based on the index and the feature quantity in each area of the reference signal obtained based on the index calculated on the reference signal transformed into the time frequency domain is calculated. Music of the input signal is identified based on the similarity.

According to the embodiments of the present technology described above, music can be identified from an input signal with a high degree of accuracy.

DETAILED DESCRIPTION OF THE EMBODIMENT(S)

Figure 1:
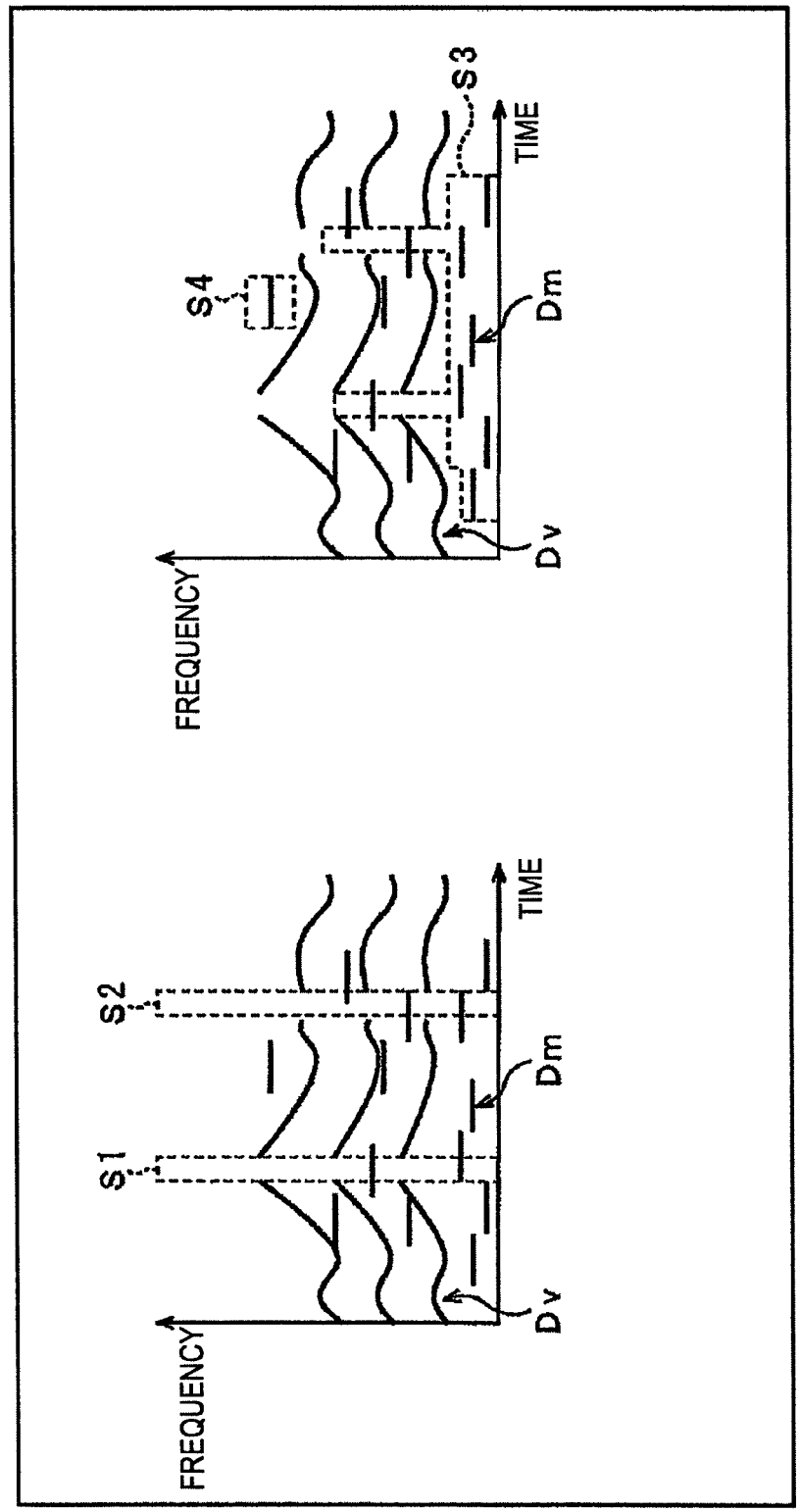
FIG. 1 is a diagram for describing a feature quantity of an input signal used for a matching process.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described with reference to the appended drawings. A description will be made in the following order.

1. Configuration of Music Search Apparatus
2. Music Identifying Process

<1. Configuration of Music Search Apparatus>

Figure 2:
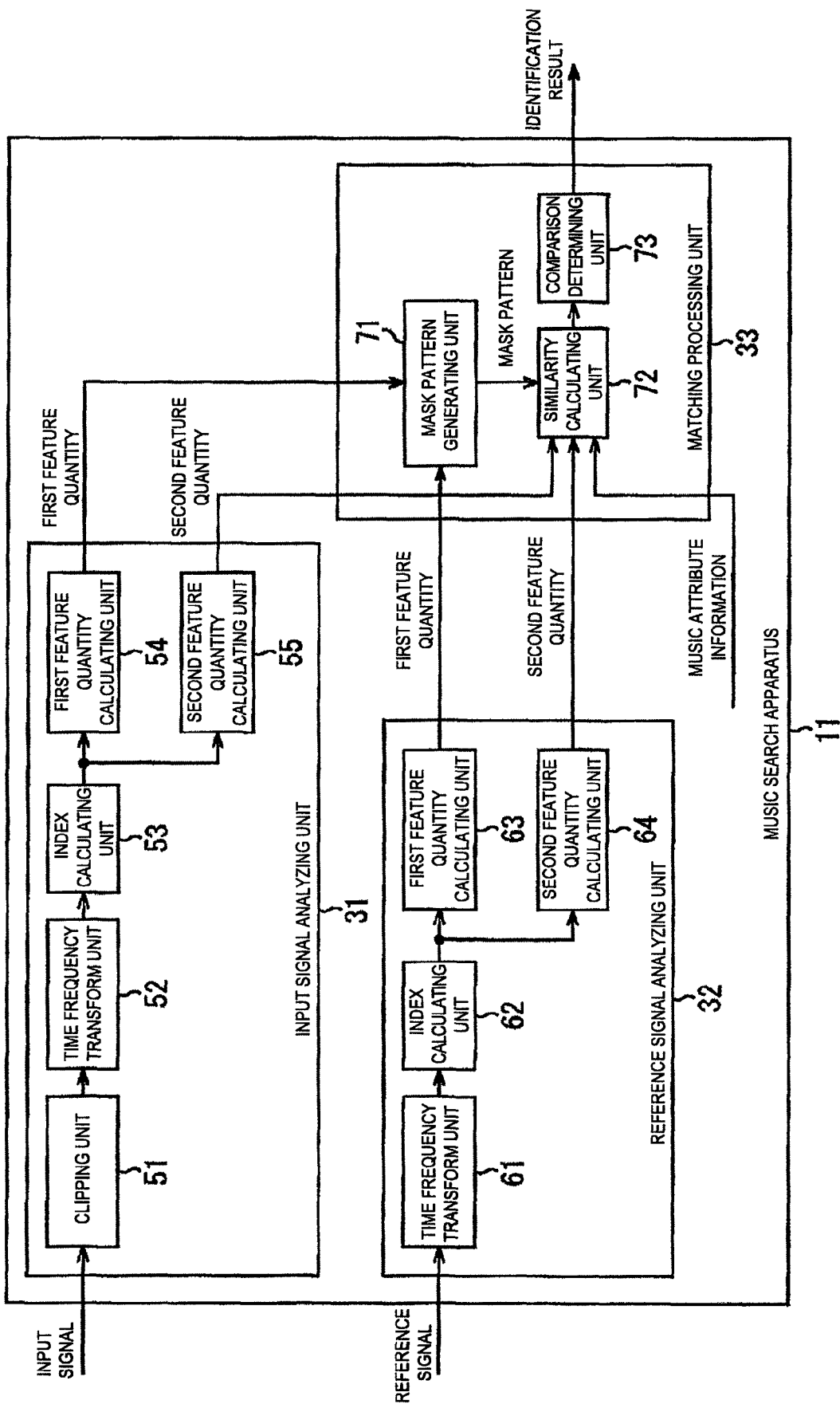
FIG. 2 is a block diagram illustrating a configuration of a music search apparatus according to an embodiment of the present technology.

FIG. 2 illustrates a configuration of a music search apparatus according to an embodiment of the present technology.

A music search apparatus 11 of FIG. 2 identifies music of an input signal by comparing an input signal, in which a music signal component is mixed with a noise component (noise) such as a conversation or ambient noise, with a reference signal including a music signal component which is not mixed with noise, and then outputs an identification result.

The music search apparatus 11 includes an input signal analyzing unit 31, a reference signal analyzing unit 32, and a matching processing unit 33.

The input signal analyzing unit 31 analyzes an input signal input from an external device or the like, extracts a feature quantity representing a feature of the input signal from the input signal, and outputs the feature quantity to the matching processing unit 33.

The input signal analyzing unit 31 includes a clipping unit 51, a time frequency transform unit 52, an index calculating unit 53, a first feature quantity calculating unit 54, and a second feature quantity calculating unit 55.

The clipping unit 51 clips a signal corresponding to a predetermined time from an input signal and outputs the clipped signal to the time frequency transform unit 52.

The time frequency transform unit 52 transforms the input signal corresponding to the predetermined time from the clipping unit 51 into a signal (spectrogram) in a time frequency domain, and supplies the spectrogram to the index calculating unit 53.

The index calculating unit 53 calculates a tonality index representing that a signal component includes music from the spectrogram of the input signal from the time frequency transform unit 52 for each time frequency domain of the spectrogram, and supplies the calculated tonality index to the first feature quantity calculating unit 54 and the second feature quantity calculating unit 55.

Here, the tonality index represents stability of a tone with respect to a time, which is represented by intensity (a power spectrum) of a signal component of each frequency in an input signal. Generally, since music includes sound in a certain key (frequency) and continuously sounds, a tone is stable in a time direction. However, a conversation has a characteristic in which a tone is unstable in a time direction, and in ambient noise, tones continuing in a time direction are rarely seen. In this regard, the index calculating unit 53 calculates the tonality index by quantifying the presence or absence of a tone and stability of a tone on an input signal corresponding to a predetermined time section.

The first feature quantity calculating unit 54 calculates a first feature quantity which is a feature quantity representing how musical an input signal is (musicality) based on the tonality index of each time frequency domain of the spectrogram from the index calculating unit 53, and supplies the first feature quantity to the matching processing unit 33.

The second feature quantity calculating unit 55 calculates a second feature quantity which is a feature quantity representing a character of music of an input signal based on the tonality index of each time frequency domain of the spectrogram from the index calculating unit 53, and supplies the second feature quantity to the matching processing unit 33.

The reference signal analyzing unit 32 analyzes a reference signal which is stored in a storage unit (not shown) or is input from an external device, extracts a feature quantity representing a feature of the reference signal from the reference signal, and supplies the extracted feature quantity to the matching processing unit 33.

The reference signal analyzing unit 32 includes a time frequency transform unit 61, an index calculating unit 62, a first feature quantity calculating unit 63, and a second feature quantity calculating unit 64.

The time frequency transform unit 61 transforms the reference signal into a spectrogram, and supplies the spectrogram to the index calculating unit 62.

The index calculating unit 62 calculates a tonality index representing that a signal component includes music from the spectrogram of the reference signal from the time frequency transform unit 61 for each time frequency domain of the spectrogram, and supplies the calculated tonality index to the first feature quantity calculating unit 63 and the second feature quantity calculating unit 64.

The first feature quantity calculating unit 63 calculates a first feature quantity which is a feature quantity representing musicality of the reference signal based on the tonality index of each time frequency domain of the spectrogram from the index calculating unit 62, and supplies the first feature quantity to the matching processing unit 33.

The second feature quantity calculating unit 64 calculates a second feature quantity which is a feature quantity representing a character of music of the reference signal based on the tonality index of each time frequency domain of the spectrogram from the index calculating unit 62, and supplies the second feature quantity to the matching processing unit 33.

The matching processing unit 33 identifies music included in the input signal by performing the matching process between the second feature quantity of the input signal from the input signal analyzing unit 31 and the second feature quantity of the reference signal from the reference signal analyzing unit 31 based on the first feature quantity of the input signal from the input signal analyzing unit 31 and the first feature quantity of the reference signal from the reference signal analyzing unit 32.

The matching processing unit 33 includes a mask pattern generating unit 71, the similarity calculating unit 72, and a comparison determining unit 73.

The mask pattern generating unit 71 generates a mask pattern used for the matching process between the second feature quantity of the input signal and the second feature quantity of the reference signal based on the first feature quantity of each time frequency domain of the input signal from the input signal analyzing unit 31 and the first feature quantity of each time frequency domain of the reference signal from the reference signal analyzing unit 32, and then supplies the generated mask pattern to the similarity calculating unit 72. Further, the mask pattern generating unit 71 calculates a first feature quantity similarity which is a similarity between the first feature quantity of each time frequency domain of the input signal from the input signal analyzing unit 31 and the first feature quantity of each time frequency domain of the reference signal from the reference signal analyzing unit 32, and supplies the first feature quantity similarity to the similarity calculating unit 72.

The similarity calculating unit 72 calculates a similarity between the second feature quantity of the input signal from the input signal analyzing unit 31 and the second feature quantity of the reference signal from the reference signal analyzing unit 32 using the mask pattern and the first feature quantity similarity from the mask pattern generating unit 71, and supplies the calculated similarity to the comparison determining unit 73.

The comparison determining unit 73 determines whether or not music included in the input signal is music of the reference signal based on the similarity from the similarity calculating unit 72, and outputs music attribute information representing an attribute of the music of the reference signal as an identification result.

[Configuration of Index Calculating Unit]

Next, a detailed configuration of the index calculating unit 53 illustrated FIG. 2 will be described with reference to FIG. 3.

Figure 3:
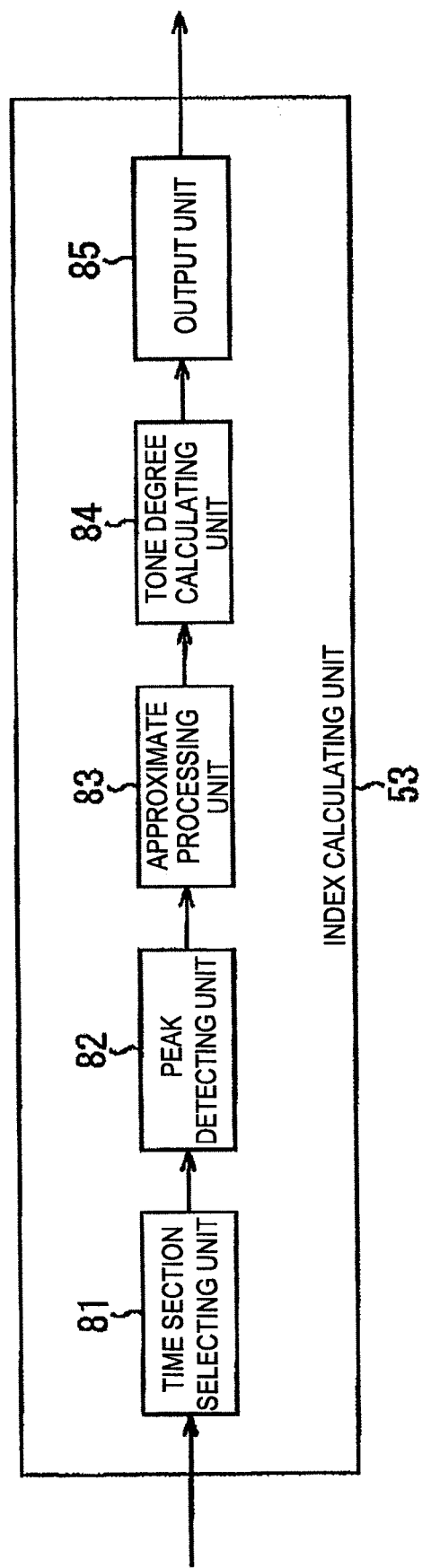
FIG. 3 is a block diagram illustrating a functional configuration example of an index calculating unit.

The index calculating unit 53 of FIG. 3 includes a time section selecting unit 81, a peak detecting unit 82, an approximate processing unit 83, a tone degree calculating unit 84, and an output unit 85.

The time section selecting unit 81 selects a spectrogram of a predetermined time section in the spectrogram of the input signal from the time frequency transform unit 52, and supplies the selected spectrogram to the peak detecting unit 82.

The peak detecting unit 82 detects a peak which is a point at which intensity of a signal component is strongest at each unit frequency in the spectrogram of the predetermined time section (time frame) selected by the time section selecting unit 81.

The approximate processing unit 83 approximates the intensity (power spectrum) of the signal component around the peak detected by the peak detecting unit 82 in the spectrogram of the predetermined time section by a predetermined function.

The tone degree calculating unit 84 calculates a tone degree obtained by quantifying a tonality index on the spectrogram corresponding to the predetermined time section based on a distance (error) between a predetermined function approximated by the approximate processing unit 83 and a power spectrum around a peak detected by the peak detecting unit 82.

The output unit 85 holds the tone degree, on the spectrogram corresponding to the predetermined time section, calculated by the tone degree calculating unit 84. The output unit 85 supplies the held tone degrees on the spectrograms of all time sections to the first feature quantity calculating unit 54 and the second feature quantity calculating unit 55 as the tonality index of the input signal corresponding to the predetermined time clipped by the clipping unit 51.

In this way, the tonality index having the tone degree (element) is calculated for each predetermined time section and for each unit frequency in the time frequency domain.

[Configuration of First Feature Quantity Calculating Unit]

Next, a detailed configuration of the first feature quantity calculating unit 54 illustrated in FIG. 2 will be described with reference to FIG. 4.

Figure 4:
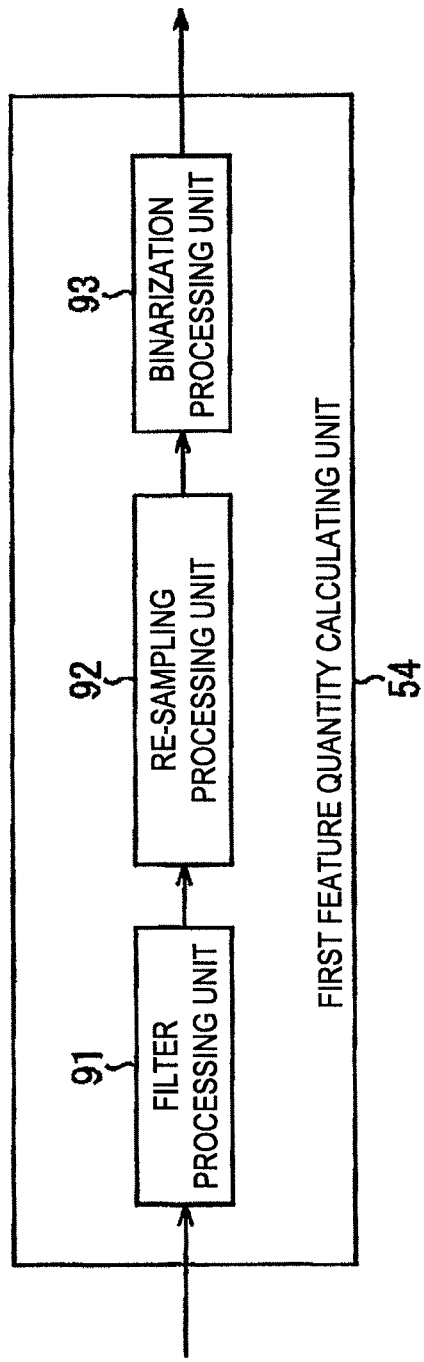
FIG. 4 is a block diagram illustrating a functional configuration example of a first feature quantity calculating unit.

The first feature quantity calculating unit 54 of FIG. 4 includes a filter processing unit 91, a re-sampling processing unit 92, and a binarization processing unit 93.

The filter processing unit 91 calculates a time average amount of a tonality index by filtering a tonality index having a tone degree (element) at each predetermined time section and each unit frequency in the time frequency domain of the input signal from the index calculating unit 53 in the time direction, and supplies the time average amount to the re-sampling processing unit 92 as the first feature quantity representing musicality of the input signal.

The re-sampling processing unit 92 performs re-sampling (down-sampling) on the first feature quantity from the filter processing unit 91 in the time direction, and supplies the down-sampled first feature quantity to the binarization processing unit 93.

The binarization processing unit 93 performs a binarization process on the down-sampled first feature quantity from the re-sampling processing unit 92, and supplies the resultant first feature quantity to the matching processing unit 33.

[Configuration of Second Feature Quantity Calculating Unit]

Next, a detailed configuration of the second feature quantity calculating unit 55 illustrated in FIG. 2 will be described with reference to FIG. 5.

Figure 5:
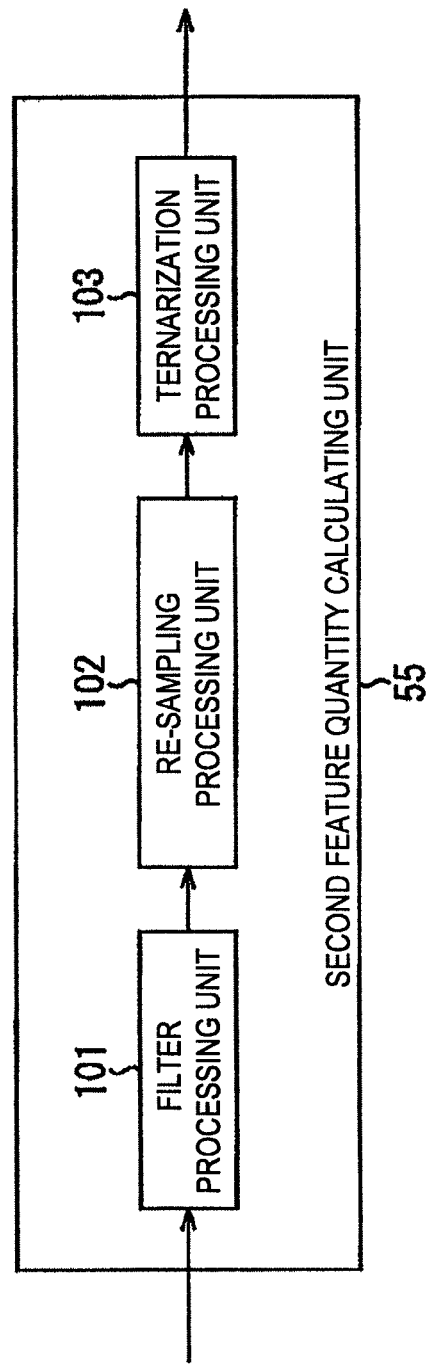
FIG. 5 is a block diagram illustrating a functional configuration example of a second feature quantity calculating unit.

The second feature quantity calculating unit 55 illustrated in FIG. 5 includes a filter processing unit 101, a re-sampling processing unit 102, and a ternarization processing unit 103.

The filter processing unit 101 calculates a time change amount of a tonality index by filtering a tonality index having a tone degree (element) at each predetermined time section and each unit frequency in the time frequency domain of the input signal from the index calculating unit 53 in the time direction, and supplies the time change amount to the re-sampling processing unit 102 as the second feature quantity representing a character of music of the input signal.

The re-sampling processing unit 102 performs re-sampling (down-sampling) on the second feature quantity from the filter processing unit 101 in the time direction, and supplies the down-sampled second feature quantity to the ternarization processing unit 103.

The ternarization processing unit 103 performs a ternarization process on the down-sampled second feature quantity from the re-sampling processing unit 102, and supplies the resultant second feature quantity to the matching processing unit 33.

The index calculating unit 62, the first feature quantity calculating unit 63, and the second feature quantity calculating unit 64 of the reference signal analyzing unit 32 illustrated in FIG. 2 have the same functions as the index calculating unit 53, the first feature quantity calculating unit 54, and the second feature quantity calculating unit 55 of the input signal analyzing unit 31, and a detailed description thereof will be omitted.

<2. Music Identifying Process>

Next, a music identifying process of the music search apparatus 11 will be described with reference to a flowchart of FIG. 6. The music identifying process starts when an input signal including music to be identified is input to the music search apparatus 11. The input signal is input continuously in terms of time to the music search apparatus 11.

In step S11, the input signal analyzing unit 31 executes an input signal analyzing process to analyze an input signal input from an external device, and extracts a feature quantity of the input signal from the input signal.

[Details of Input Signal Analyzing Process]

Here, the details of the input signal analyzing process in step S11 of the flowchart of FIG. 6 will be described with reference to a flowchart of FIG. 7.

In step S31, the clipping unit 51 of the input signal analyzing unit 31 clips a signal corresponding to a predetermined time (for example, 15 seconds) from the input signal, and supplies the clipped signal to the time frequency transform unit 52.

In step S32, the time frequency transform unit 52 transforms the input signal corresponding to the predetermined time from the clipping unit 51 into a spectrogram using a window function such as a Hann window or using a discrete Fourier transform (DFT) or the like, and supplies the spectrogram to the index calculating unit 53. Here, the window function is not limited to the Hann function, and a sine window or a Hamming window may be used. Further, the present invention is not limited to DFT, and a discrete cosine transform (DCT) may be used. Further, the transformed spectrogram may be any one of a power spectrum, an amplitude spectrum, and a logarithmic amplitude spectrum. Further, in order increase the frequency resolution, a frequency transform length may be increased to be larger than (for example, twice or four times) the length of a window by oversampling by zero-padding.

In step S33, the index calculating unit 53 executes an index calculating process and thus calculates a tonality index of the input signal from the spectrogram of the input signal from the time frequency transform unit 52 in each time frequency domain of the spectrogram.

[Details of Index Calculating Process]

Here, the details of the index calculating process in step S33 of the flowchart of FIG. 7 will be described with reference to a flowchart of FIG. 8.

In step S51, the time section selecting unit 81 of the index calculating unit 53 selects a spectrogram of a predetermined time section (for example, during a first second of an input signal having a duration of 25 seconds) in the spectrogram of the input signal from the time frequency transform unit 32, and supplies the selected spectrogram to the peak detecting unit 82.

In step S52, the peak detecting unit 82 detects a peak, which is a point in the time frequency domain at which a power spectrum (intensity) of the signal component on each frequency band is strongest near the frequency band in the spectrogram corresponding to one second selected by the time section selecting unit 81 for each time frame (time bin).

Figure 6:
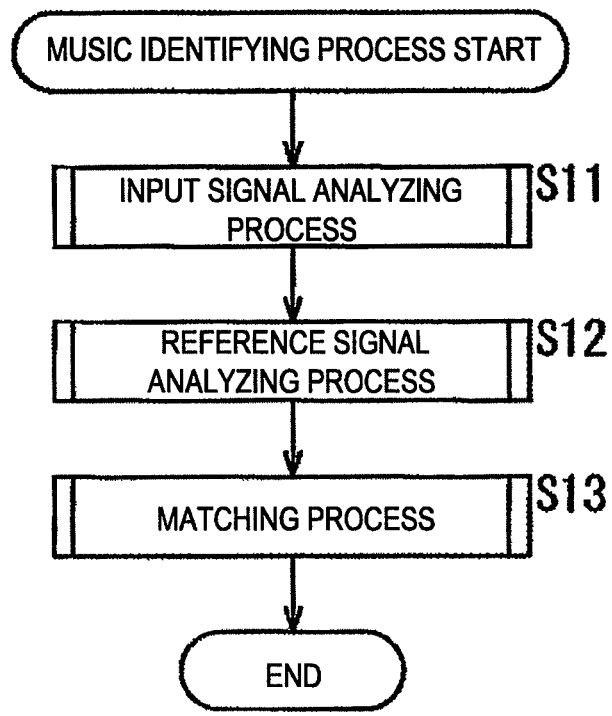
FIG. 6 is a flowchart for describing a music identifying process.
Figure 9:
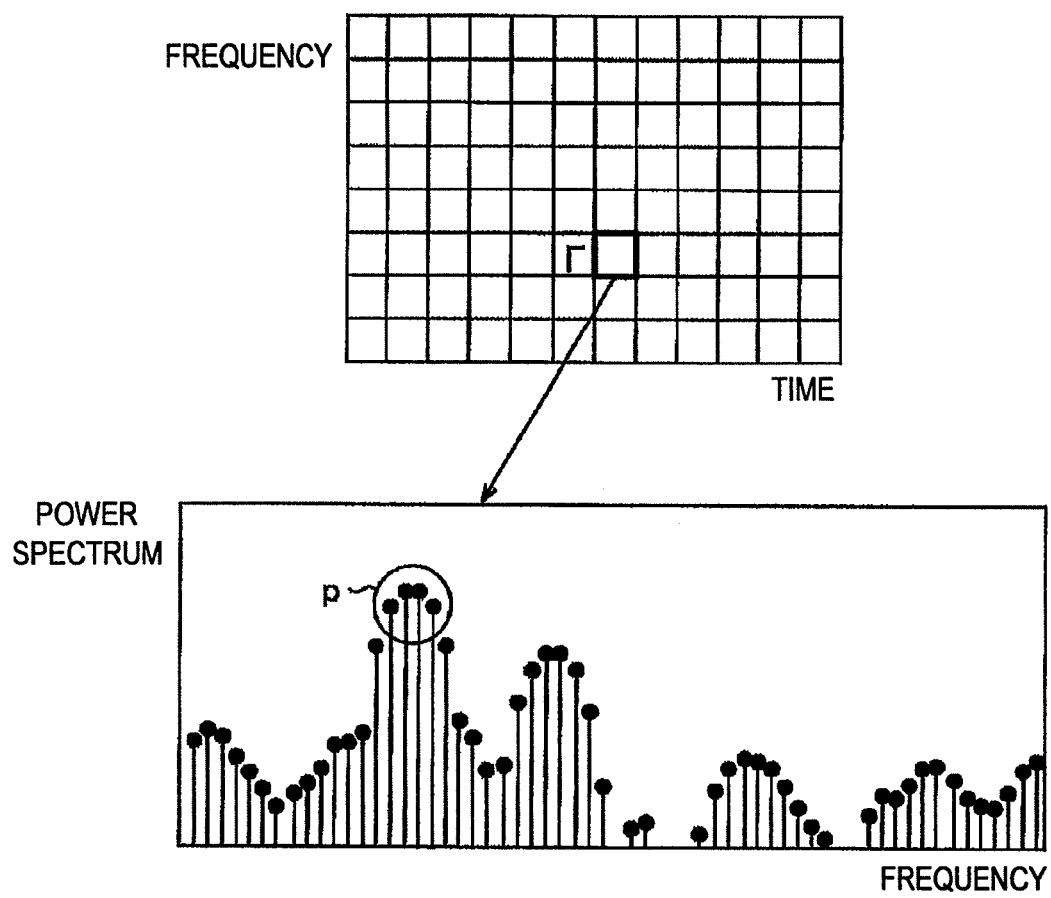
FIG. 9 is a diagram for describing detection of a peak.

For example, in the spectrogram of the input signal, which is transformed into the time frequency domain, illustrated in an upper portion of FIG. 6, a peak p illustrated in a lower portion of FIG. 9 is detected in a time frequency domain F near a certain frequency of a certain frame.

In step S53, the approximate processing unit 83 approximates the power spectrum around the peak of each frequency band of each time frame detected by the peak detecting unit 82 on the spectrogram corresponding to one second selected by the time section selecting unit 81 by a template function which is a previously defined typical function. In the following, the template function is a quadratic function, but is not limited thereto. The template function may be any other function such as a high-dimensional function of a cubic or higher degree function or a trigonometric function.

As described above, the peak p is detected in the lower side of FIG. 9. However, the power spectrum that peaks is not limited to a tone (hereinafter referred to as a "persistent tone") that is stable in a time direction. Since the peak may be caused by a signal component such as noise, a side lobe, interference, or a time varying tone, the tonality index may not be appropriately calculated based on the peak. Further, since a DFT peak is discrete, the peak frequency is not necessarily a true peak frequency.

According to a literature J. O. Smith III and X. Serra: "PARSHL: A program for analysis/synthesis of inharmonic sounds based on a sinusoidal representation" in Proc. ICMC '87, a value of a logarithmic power spectrum around a peak in a certain time frame can be approximated by a quadratic function regardless of whether it is music or a human voice.

Thus, in the present technology, a power spectrum around a peak of each frequency band of each time frame is approximated by a quadratic function.

Further, in the present technology, it is determined whether or not a peak is caused by a persistent tone under the following assumptions.

a) A persistent tone is approximated by a function obtained by extending a quadratic function in a time direction.

b) A temporal change in frequency is subjected to zero-order approximation (does not change) since a peak by music persists in a time direction.

c) A temporal change in amplitude needs to be permitted to some extent and is approximated, for example, by a quadratic function.

Figure 10:
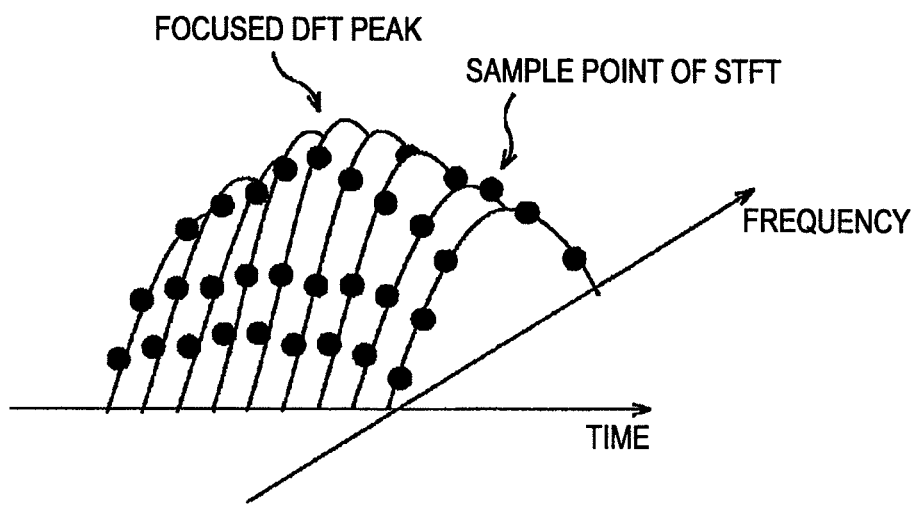
FIG. 10 is a diagram for describing approximation of a power spectrum around a peak.

Thus, a persistent tone is modeled by a tunnel type function (biquadratic function) obtained by extending a quadratic function in a time direction in a certain time frame as illustrated in FIG. 10, and can be represented by the following Formula (1) on a time t and a frequency $\omega$. Here, $\omega_p$ represents a peak frequency.

[Math. 1]

$$g(t,\omega) = f(\omega - \omega_p)^2 + ct^2 + dt + e \tag{1}$$

Thus, an error obtained by applying a biquadratic function based on the assumptions a) to c) around a focused peak, for example, by least squares approximation can be used as a tonality (persistent tonality) index. That is, the following Formula (2) can be used as an error function.

[Math. 2]

$$J(a, b, c, d, e) = \sum_{\Gamma} (f(k, n) - g(k, n))^2 \to \min \tag{2}$$

In Formula (2), f(k,n) represents a DFT spectrum of an n-th frame and a k-th bin, and g(k,n) is a function having the same meaning as Formula (1) representing a model of a persistent tone and is represented by the following Formula (3).

[Math. 3]

$$g(k,n) = ak^2 + bk + cn^2 + dn + e \tag{3}$$

In Formula (2), $\Gamma$ represents a time frequency domain around a peak of a target. In the time frequency domain $\Gamma$, the size in a frequency direction is decided, according to the number of windows used for time-frequency transform, not to be larger than the number of sample points of a main lobe decided by a frequency transform length. Further, the size in a time direction is decided according to a time length necessary for defining a persistent tone.

Referring back to FIG. 8, in step S54, the tone degree calculating unit 84 calculates a tone degree, which is a tonality index, on the spectrogram corresponding to one second selected by the time section selecting unit 81 based on an error between the quadratic function approximated by the approximate processing unit 83 and the power spectrum around a peak detected by the peak detecting unit 82, that is, the error function of Formula (2).

Here, an error function obtained by applying the error function of Formula (2) to a plane model is represented by the following Formula (4), and at this time a tone degree $\eta$ can be represented by the following Formula (5).

[Math. 4]

$$J'(e') = \sum_{\Gamma} (f(k, n) - e')^2 \to \min \tag{4}$$

[Math. 5]

$$\eta(k, n) = 1 - \sqrt{J(\hat{a}, \hat{b}, \hat{c}, \hat{d}, \hat{e})/J'(\hat{e}')} \tag{5}$$

In Formula (5), a hat (a character in which "^" is attached to "a" is referred to as "a hat," and in this disclosure, similar representation is used), b hat, c hat, d hat, and e hat are a, b, c, d, and e for which J(a,b,c,d,e) is minimized, respectively, and e' hat is e' for which J(e') is minimized.

In this way, the tone degree $\eta$ is calculated.

Meanwhile, in Formula (5), a hat represents a peak curvature of a curved line (quadratic function) of a model representing a persistent tone.

When the signal component of the input signal is a sine wave, theoretically the peak curvature is an integer decided by the type and the size of a window function used for time-frequency transform. Thus, as a value of an actually obtained peak curvature a hat deviates from a theoretical value, a possibility that the signal component is a persistent tone is considered to be lowered. Further, even if the peak has a side lobe characteristic, since the obtained peak curvature is changed, it can be said that deviation of the peak curvature a hat affects the tonality index. In other words, by adjusting the tone degree $\eta$ according to a value deviating from the theoretical value of the peak curvature a hat, a more appropriate tonality index can be obtained. A tone degree $\eta'$ adjusted according to the value deviating from the theoretical value of the peak curvature a hat is represented by the following Formula (6).

[Math. 6]

$$\eta'=(k,n)=D(\hat{a}-a_{ideal})\eta(k,n) \tag{6}$$

Figure 11:
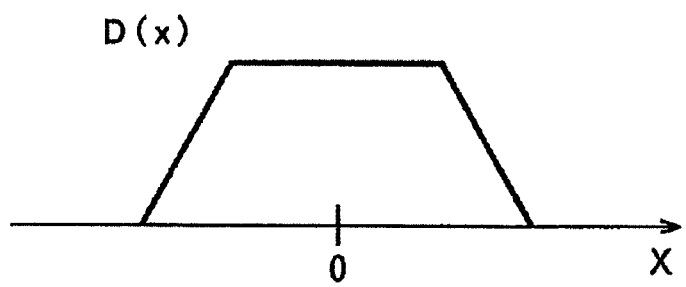
FIG. 11 is a diagram for describing an index adjusting function.

In Formula (6), a value $a_{ideal}$, is a theoretical value of a peak curvature decided by the type and the size of a window function used for time-frequency transform. A function D(x) is an adjustment function having a value illustrated in FIG. 11. According to the function D(x), as a difference between a peak curvature value and a theoretical value increases, the tone degree decreases. In other words, according to Formula (6), the tone degree η' is zero (0) on an element which is not a peak. The function D(x) is not limited to a function having a shape illustrated in FIG. 11, and any function may be used to the extent that as a difference between a peak curvature value and a theoretical value increases, a tone degree decreases.

As described above, by adjusting the tone degree according to the peak curvature of the curved line (quadratic function), a more appropriate tone degree is obtained.

Meanwhile, a value "−(b hat)/2(a hat)" given by a hat and b hat in Formula (5) represents an offset from a discrete peak frequency to a true peak frequency.

Theoretically, the true peak frequency is at the position of ±0.5 bin from the discrete peak frequency. When an offset value "−(b hat)/2(a hat)" from the discrete peak frequency to the true peak frequency is extremely different from the position of a focused peak, a possibility that matching for calculating the error function of Formula (2) is not correct is high. In other words, since this is considered to affect reliability of the tonality index, by adjusting the tone degree according to a deviation value of the offset value "−(b hat)/2(a hat)" from the position (peak frequency) kp of the focused peak, a more appropriate tonality index may be obtained. Specifically, a value obtained by multiplying a left-hand side of Formula (6) by a term in which "−(b hat)/2(a hat)−kp" is assigned to a function D(x) illustrated in FIG. 11 may be used as the tone degree η.

The tone degree η may be calculated by a technique other than the above described technique.

Specifically, first, an error function of the following Formula (7) obtained by replacing the model g(k,n) representing the persistent tone with a quadratic function "ak2+bk+c" obtained by approximating a time average shape of a power spectrum around a peak in the error function of Formula (2) is given.

[Math. 7]

$$J(a,b,c) = \sum_{\Gamma} (f(k,n) - (ak^2 + bk + c))^2 \to \min \quad (7)$$

Next, an error function of the following Formula (8) obtained by replacing the model g(k,n) representing the persistent tone with a quadratic function a' "k2+b'k+c'" obtained by approximating a time average shape of a power spectrum of an m-th frame of a focused peak in the error function of Formula (2) is given. Here, m represents a frame number of a focused peak.

[Math. 8]

$$J'(a',b',c') = \sum_{\Gamma, n=m} (f(k,n) - (a'k^2 + b'k + c'))^2 \to \min \quad (8)$$

Here, when a, b, and c for which J(a,b,c) is minimized are referred to as a hat, b hat, and c hat, respectively, in Formula (7) and a', b', and c' for which J(a',b',c') is minimized are referred to as a' hat, b' hat, and c' hat, respectively, in Formula (8), the tone degree η is given by the following Formula (9).

[Math. 9]

$$\eta'(k,n) = D_1\left(1 - \frac{\hat{a}}{\hat{a}'}\right) D_2\left\{\left(-\frac{\hat{b}}{2\hat{a}'}\right) - \left(-\frac{\hat{b}'}{2\hat{a}'}\right)\right\} \quad (9)$$

Figure 8:
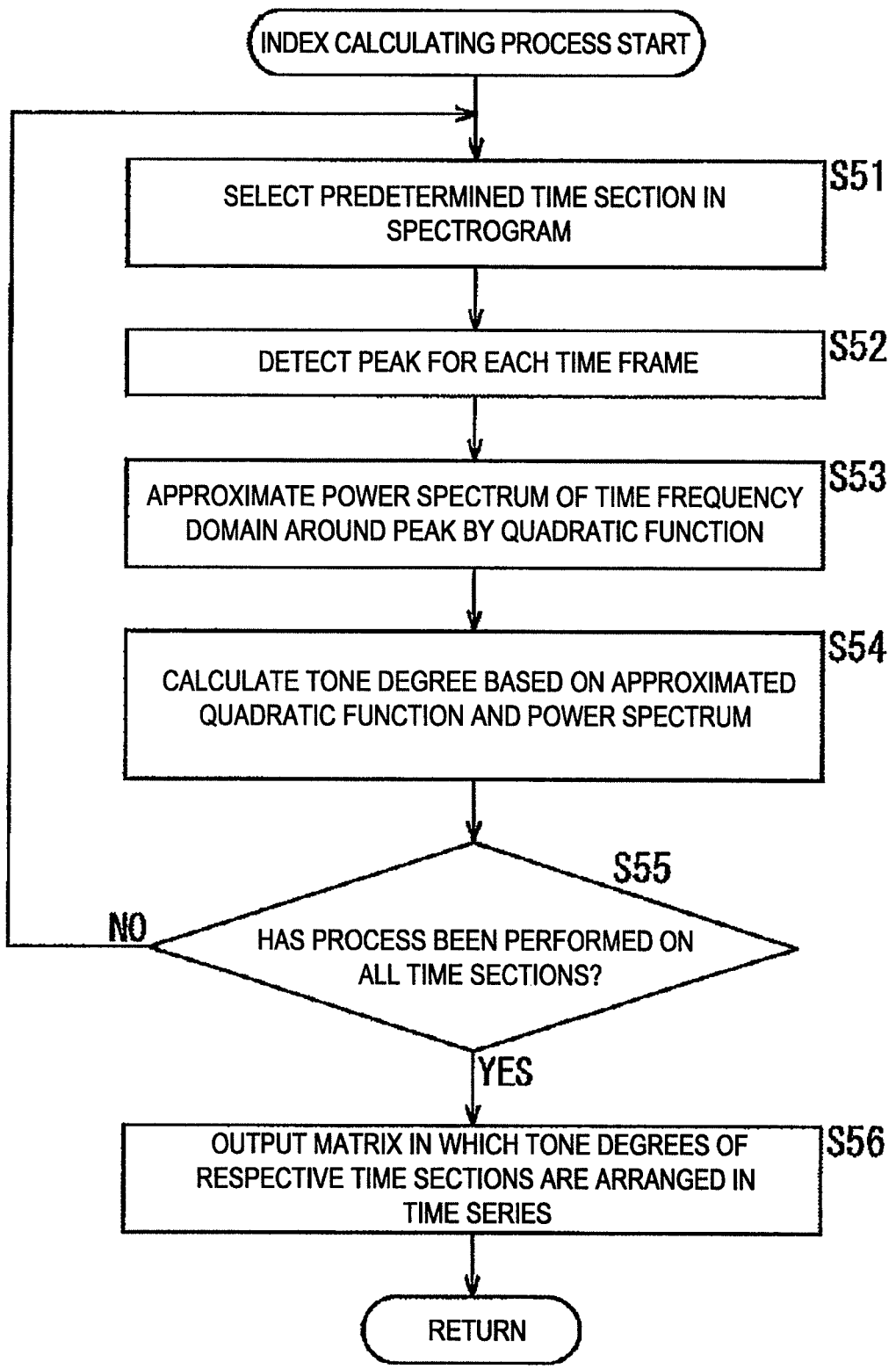
FIG. 8 is a flowchart for describing an index calculating process.

In Formula (9), functions D1(x) and D2(x) are functions having a value illustrated in FIG. 8. According to Formula (9), on an element that is not a peak, the tone degree η' is zero (0), and when a hat is zero (0) or a' hat is zero (0), the tone degree η' is zero (0).

Further, non-linear transform may be executed on the tone degree η calculated in the above described way by a sigmoidal function or the like.

Referring back to FIG. 8, in step S55, the output unit 85 holds the tone degree, for the spectrogram corresponding to one second, calculated by the tone degree calculating unit 84, and determines whether or not the above-described process has been performed on all time sections (for example, 15 seconds).

When it is determined in step S55 that the above-described process has not been performed on all time sections, the process returns to step S51, and the processes of steps S51 to S55 are repeated on a spectrogram of a next time section (one section). The processes of steps S51 to S55 may be performed on a spectrogram of each time section having a length of one second as described above or may be performed such that a time section of a spectrogram which is a processing target is shifted, for example, by 0.5 seconds, and a time section of a processing target partially overlaps a time section of a previous processing target.

However, when it is determined in step S55 that the above-described process has been performed on all time sections, the process proceeds to step S56.

In step S56, the output unit 85 supplies (outputs) a matrix obtained by arranging the held tone degrees of the respective time sections (each having a length of one second) in time series to the first feature quantity calculating unit 54 and the second feature quantity calculating unit 55. Then, the process returns to step S33.

Figure 12:
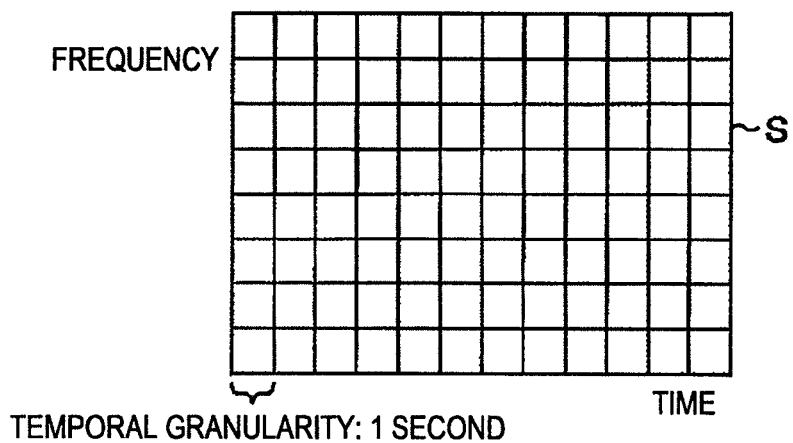
FIG. 12 is a diagram for describing an example of a tonality index of an input signal.

FIG. 12 is a diagram for describing an example of the tonality index calculated by the index calculating unit 53.

As illustrated in FIG. 12, a tonality index S of the input signal calculated from the spectrogram of the input signal has a tone degree as an element (hereinafter referred to as a "component") in a time direction and a frequency direction. Each quadrangle (square) in the tonality index S represents a component at each time and each frequency and has a value as a tone degree, although these are not shown. Further, as illustrated in FIG. 12, a temporal granularity of the tonality index S is, for example, one second.

As described above, the tonality index of the input signal calculated from the spectrogram of the input signal has a component at each time and each frequency and thus can be dealt with as a matrix. In the following a tonality index as a matrix is appropriately referred to as an index matrix.

Further, the tone degree may not be calculated on an extremely low frequency band since a possibility that a peak by a non-music signal component such as humming noise is included is high. Further, the tone degree may not be calculated, for example, on a high frequency band higher than 8 kHz since a possibility that it is not an important element that configures music is high. Furthermore, even when a value of a power spectrum in a discrete peak frequency is smaller than a predetermined value such as −80 dB, the tone degree may not be calculated.

Figure 7:
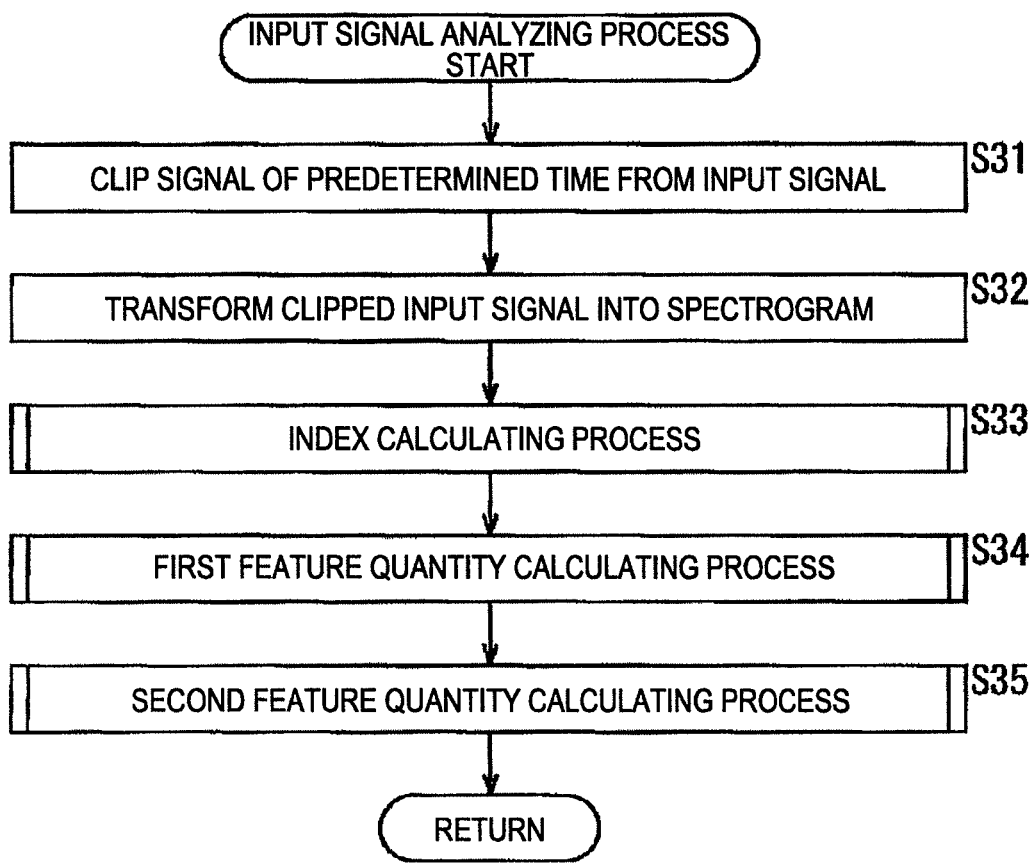
FIG. 7 is a flowchart for describing an input signal analyzing process.

Returning to the flowchart of FIG. 7, after step S33, in step S34, the first feature quantity calculating unit 54 executes a first feature quantity calculating process based on the tonality index from the index calculating unit 53 and thus calculates the first feature quantity representing musicality of the input signal.

[Details of First Feature Quantity Calculating Process]

Figure 13:
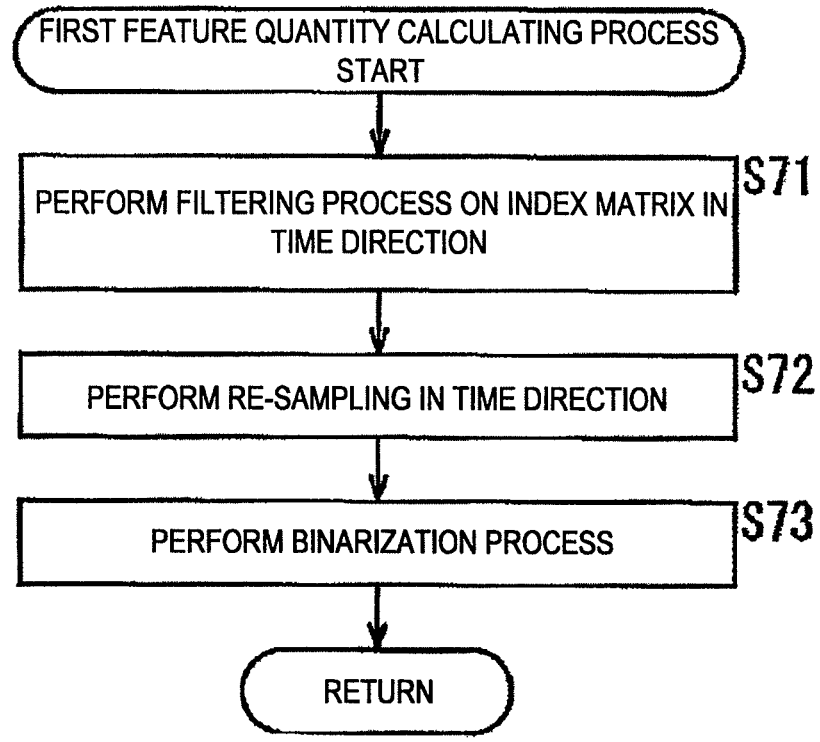
FIG. 13 is a flowchart for describing a first feature quantity calculating process.

Here, the details of the first feature quantity calculating process in step S34 of the flowchart of FIG. 7 will be described with reference to a flowchart of FIG. 13.

In step S71, the filter processing unit 91 calculates a time average amount of the tonality index by filtering the index matrix from the index calculating unit 53 in the time direction, for example, using a window function (smoothing filter) such as a Hann window, and supplies the time average amount to the re-sampling processing unit 92 as the first feature quantity representing musicality of the input signal.

In step S72, the re-sampling processing unit 92 performs re-sampling (down-sampling) on the first feature quantity from the filter processing unit 91 in the time direction, and supplies the down-sampled first feature quantity to the binarization processing unit 93.

In step S73, the binarization processing unit 93 performs a binarization process on the down-sampled first feature quantity from the re-sampling processing unit 92, and supplies the resultant first feature quantity to the matching processing unit 33. Then, the process returns to step S34.

Figure 14:
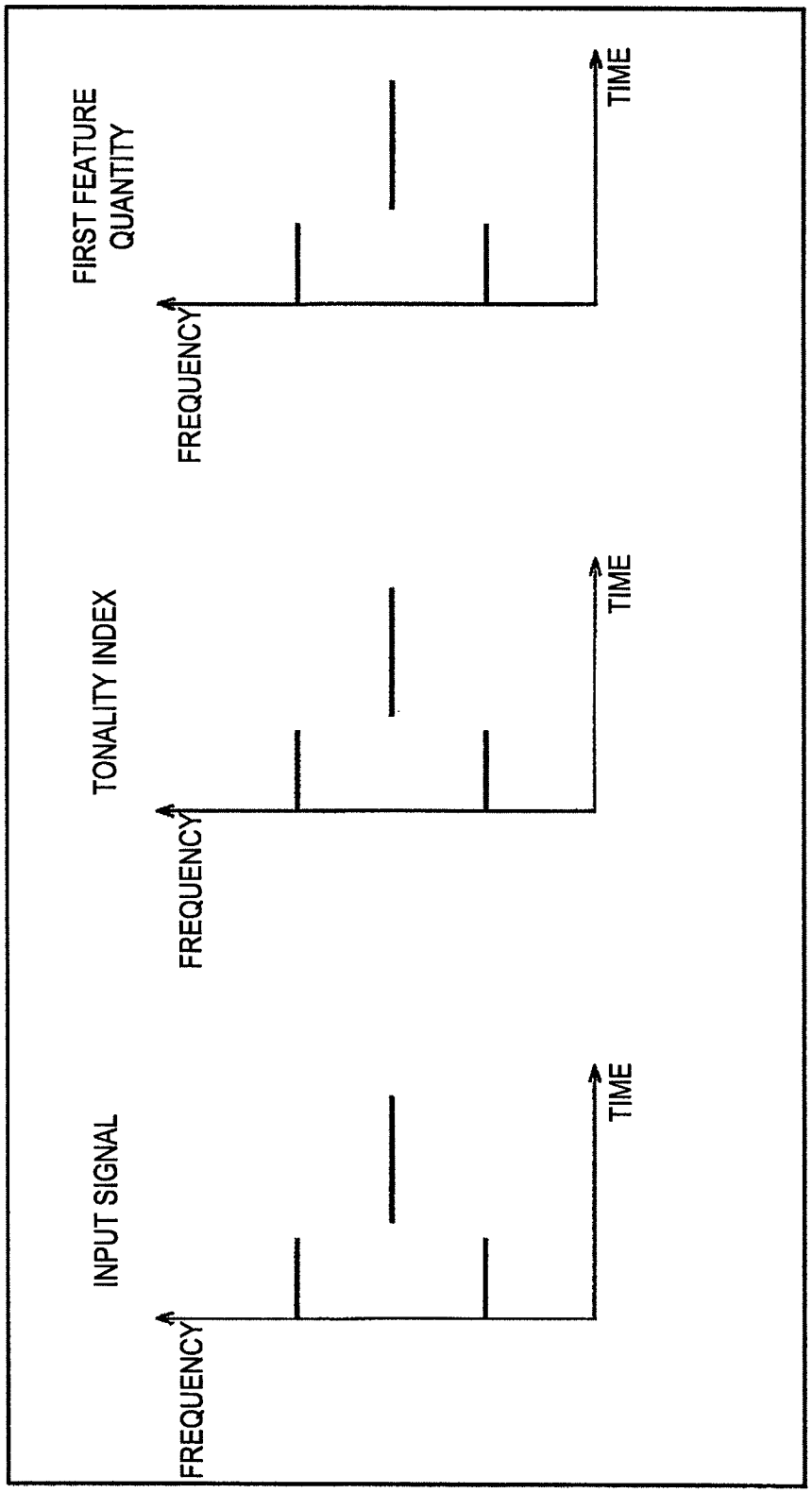
FIG. 14 is a diagram for describing an example of a first feature quantity.

FIG. 14 illustrates an example of the first feature quantity obtained by the above described process.

In FIG. 14, an input signal, a tonality index, and a first feature quantity of a time frequency domain are illustrated in order from the left. When a music signal component is included in the input signal, a value of a corresponding time frequency domain increases in the tonality index (a persistent tone is shown). In an area where the tonality index has a large value (a persistent tone is shown), the first feature quantity having a large value is shown by the above described first feature quantity calculating process. Thus, the first feature quantity has a value in the same area as the music signal component of the input signal as illustrated in FIG. 14. Further, since the value is binarized into values such as 0 and 1, an information amount of the first feature quantity is reduced, and thus a subsequent process can be performed at a high speed.

A threshold value used for the binarization process may be a fixed value or a statistical value obtained from an average value of each time frame or the like.

Further, in the first feature quantity calculating process, re-sampling may be performed in the frequency direction as well as in the time direction, and a quantization process may be performed instead of the binarization process.

Returning to the flowchart of FIG. 7, after step S34, in step S35, the second feature quantity calculating unit 55 executes the second feature quantity calculating process based on the tonality index from the index calculating unit 53, and calculates the second feature quantity representing a character of music of the input signal.

[Details of Second Feature Quantity Calculating Process]

Figure 15:
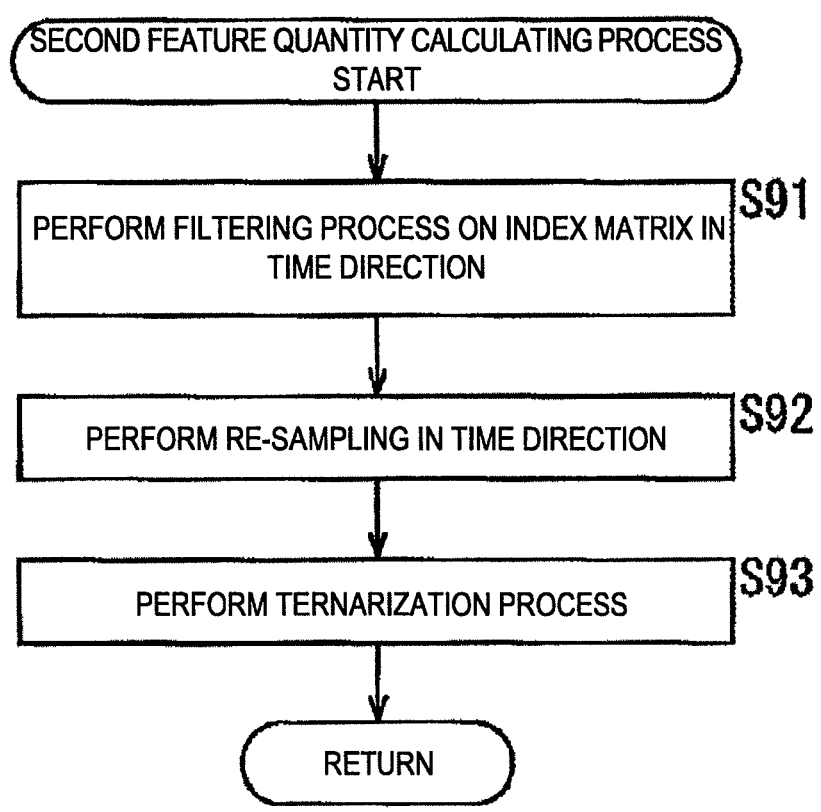
FIG. 15 is a flowchart for describing a second feature quantity calculating process.

Here, the details of the second feature quantity calculating process in step S35 of the flowchart of FIG. 7 will be described with reference to the flowchart of FIG. 15.

In step S91, the filter processing unit 101 calculates a time average change amount of a tonality index by filtering the index matrix from the index calculating unit 53 in the time direction using a window function (filter) such as one period sine window, and supplies the time average change amount to the re-sampling processing unit 102 as the second feature quantity representing a character of music of the input signal.

In step S92, the re-sampling processing unit 102 performs re-sampling (down-sampling) on the second feature quantity from the filter processing unit 101 in the time direction, and supplies the down-sampled second feature quantity to the ternarization processing unit 103.

In step S93, the ternarization processing unit 103 performs a ternarization process on the down-sampled second feature quantity from the re-sampling processing unit 102, and supplies the resultant second feature quantity to the matching processing unit 33. Then, the process returns to step S35.

Figure 16:
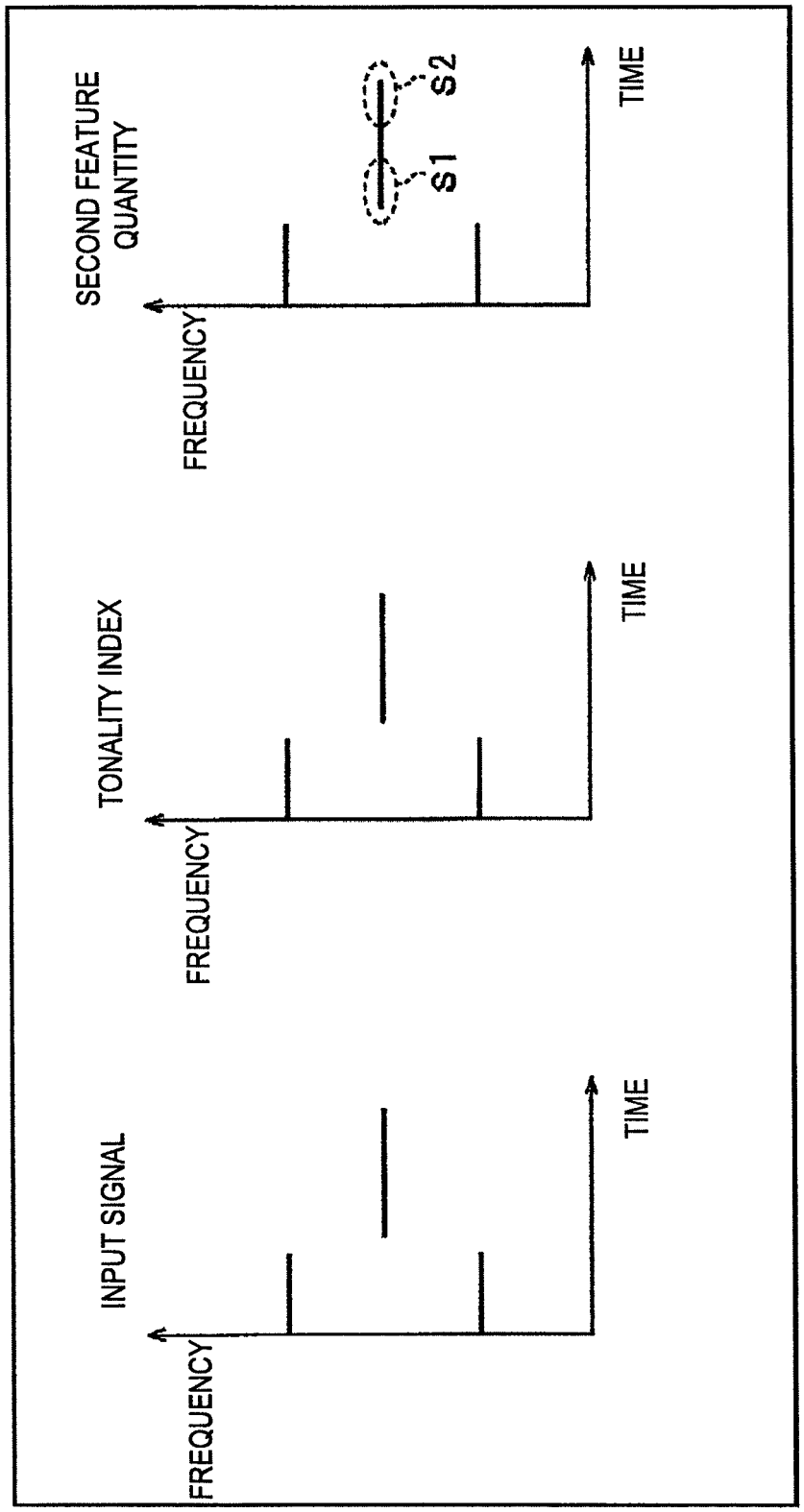
FIG. 16 is a diagram for describing an example of a second feature quantity.

FIG. 16 illustrates an example of the second feature quantity obtained by the above described process.

In FIG. 16, an input signal, a tonality index, and a second feature quantity of a time frequency domain are illustrated in order from the left. When a music signal component is included in the input signal, a value of a corresponding time frequency domain increases in the tonality index (a persistent tone is shown). In an area where the tonality index has a large value (a persistent tone is shown), the second feature quantity that has a large value (a positive value) at a rising edge of a tone and a small value (a negative value) at a falling edge of a tone is shown by the above described second feature quantity calculating process. Thus, the second feature quantity has a value in the same area as the music signal component of the input signal, and the value becomes a positive value in an area s1 in FIG. 16 and a negative value in an area s2 as illustrated in FIG. 16. Further, since the value is ternarized into values such as −1, 0, and 1, an information amount of the second feature quantity is reduced, and thus a subsequent process can be performed at a high speed.

A threshold value used for the ternarization process may be a fixed value or a statistical value obtained from an average value of each time frame or the like.

Further, in the second feature quantity calculating process, re-sampling may be performed in the frequency direction as well as in the time direction, and a quantization process may be performed instead of the ternarization process.

The granularities of the first feature quantity and the second feature quantity in the time direction and the frequency direction become equal to each other.

Returning to the flowchart of FIG. 7, after step S35, the process returns to step S11 of the flowchart of FIG. 6.

In the flowchart of FIG. 6, after step S11, the process proceeds to step S12. In step S12, the reference signal analyzing unit 32 executes a reference signal analyzing process to analyze the reference signal input from an external device, and extracts a feature quantity representing a feature of the reference signal.

[Details of Reference Signal Analyzing Process]

Here, the details of the reference signal analyzing process in step S12 of the flowchart of FIG. 6 will be described with reference to the flowchart of FIG. 17.

In step S111, the time frequency transform unit 61 of the reference signal analyzing unit 32 transforms the input reference signal into a spectrogram, and supplies the spectrogram to the index calculating unit 62.

In step S112, the index calculating unit 62 executes the index calculating process to calculate a tonality index of the reference signal from the spectrogram of the reference signal from the time frequency transform unit 61 for each time frequency domain of the spectrogram, similarly to the index calculating unit 53, and supplies the calculated tonality index to the first feature quantity calculating unit 63 and the second feature quantity calculating unit 64.

The index calculating process of step S112 is basically the same as the index calculating process described with reference to the flowchart of FIG. 8, and thus a description thereof will be omitted.

In step S113, the first feature quantity calculating unit 63 executes the first feature quantity calculating process to calculate a first feature quantity representing musicality of the reference signal based on the tonality index from the index calculating unit 62, similarly to the first feature quantity calculating unit 54, and supplies the first feature quantity to the matching processing unit 33.

The first feature quantity calculating process of step S113 is basically the same as the first feature quantity calculating process described with reference to the flowchart of FIG. 13, and thus a description thereof will be omitted. Any other value may be used as a threshold value used for the binarization process.

In step S114, the second feature quantity calculating unit 64 executes the second feature quantity calculating process to calculate a second feature quantity representing a character of music of the reference signal based on the tonality index from the index calculating unit 62, similarly to the second feature quantity calculating unit 55, and supplies the second feature quantity to the matching processing unit 33.

The second feature quantity calculating process of step S114 is basically the same as the second feature quantity calculating process described with reference to the flowchart of FIG. 15, and thus a description thereof will be omitted.

At this time, the reference signal analyzing unit 32 reads music attribute information (a song name, a performer name, a song ID, and the like) representing an attribute of music of the reference signal from a database (not shown) in the music search apparatus 11, and supplies the music attribute information to the matching processing unit 33 in the form associated with the calculated feature quantity (the first and second feature quantities) of the reference signal.

Further, feature quantities and music attribute information on a plurality of reference signals may be stored in a database (not shown) in the music search apparatus 11 and may be acquired by the matching processing unit 33.

Figure 17:
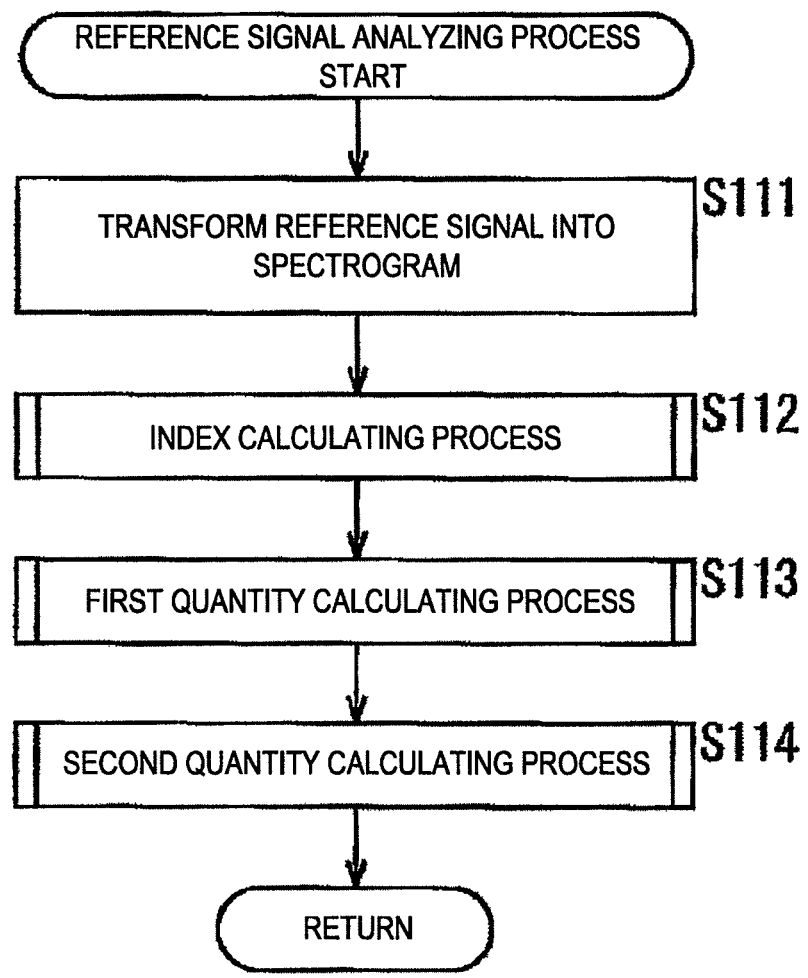
FIG. 17 is a flowchart for describing a reference signal analyzing process.

In the flowchart of FIG. 17, after step S114, the process returns to step S12 of the flowchart of FIG. 6.

The first feature quantities and the second feature quantities of the input signal and the reference signal are dealt with as matrices, and granularities in the time direction and in frequency direction are identical to each other.

Further, the second feature quantity representing a character of music is not limited to the time change amount of the tonality index of an input signal (reference signal), and any other evaluation value may be used.

In the flowchart of FIG. 6, after step S12, the process proceeds to step S13. In step S13, the matching processing unit 33 executes the matching process, identifies music included in the input signal, and outputs the identification result.

[Details of Matching Process]

Here, the details of the matching process in step S13 of the flowchart of FIG. 6 will be described with reference to the flowchart of FIG. 18.

In step S131, the mask pattern generating unit 71 generates a mask pattern used for the matching process between the second feature quantity of the input signal and the second feature quantity of the reference signal based on the first feature quantity of each time frequency domain of the input signal from the input signal analyzing unit 31 and the first feature quantity of each time frequency domain of the reference signal from the reference signal analyzing unit 32, and then supplies the generated mask pattern to the similarity calculating unit 72.

Figure 19:
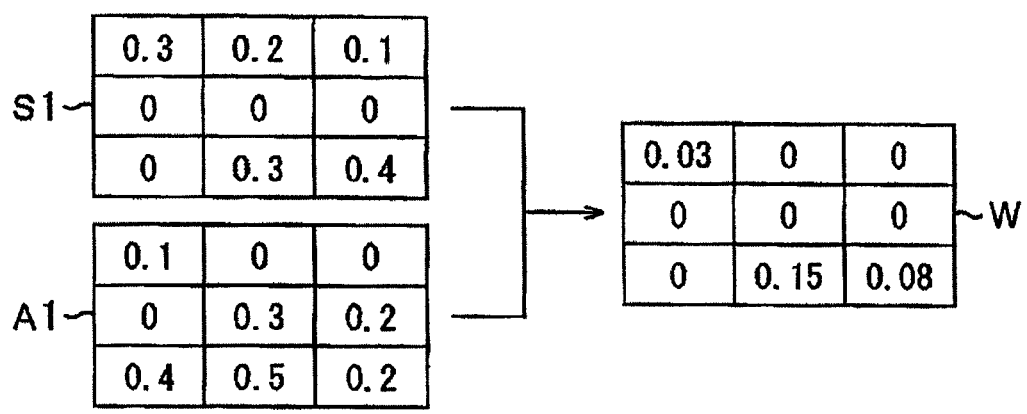
FIG. 19 is a diagram for describing a generation example of a mask pattern.

For example, when a first feature quantity S1 illustrated in an upper left portion of FIG. 19 is supplied as the first feature quantity from the input signal analyzing unit 31, and a first feature quantity A1 illustrated in a lower left portion of FIG. 19 is supplied as the first feature quantity of the reference signal analyzing unit 32, the mask pattern generating unit 71 generates a mask pattern W having values obtained by multiplying elements of the first feature quantity S1 by elements of the first feature quantity A1 as elements. As described above, the mask pattern is generated as a weight distribution in which, in the spectrograms of the input signal and the reference signal, an area which is high in a tonality index is weighted according to the first feature quantity, and an area which is low in a tonality index is masked.

In step S132, the mask pattern generating unit 71 calculates a similarity R1 between the second feature quantity S1 of the input signal and the second feature quantity A1 of the reference signal from the reference signal analyzing unit 32 based on the elements of the first feature quantity of each time frequency domain of the input signal from the input signal analyzing unit 31 and the elements of the first feature quantity of each time frequency domain of the reference signal from the time frequency domain, and supplies the calculated similarity R1 to the similarity calculating unit 72.

In step S133, the similarity calculating unit 72 calculates a similarity between the second feature quantity of the input signal from the input signal analyzing unit 31 and the second feature quantity of the reference signal from the reference signal analyzing unit 32 using the mask pattern W and the first feature quantity similarity R1 from the mask pattern generating unit 71, and supplies the calculated similarity to the comparison determining unit 73.

Here, an example of calculating a similarity between the second feature quantity of the input signal and the second feature quantity of the reference signal will be described with reference to FIG. 20.

Figure 20:
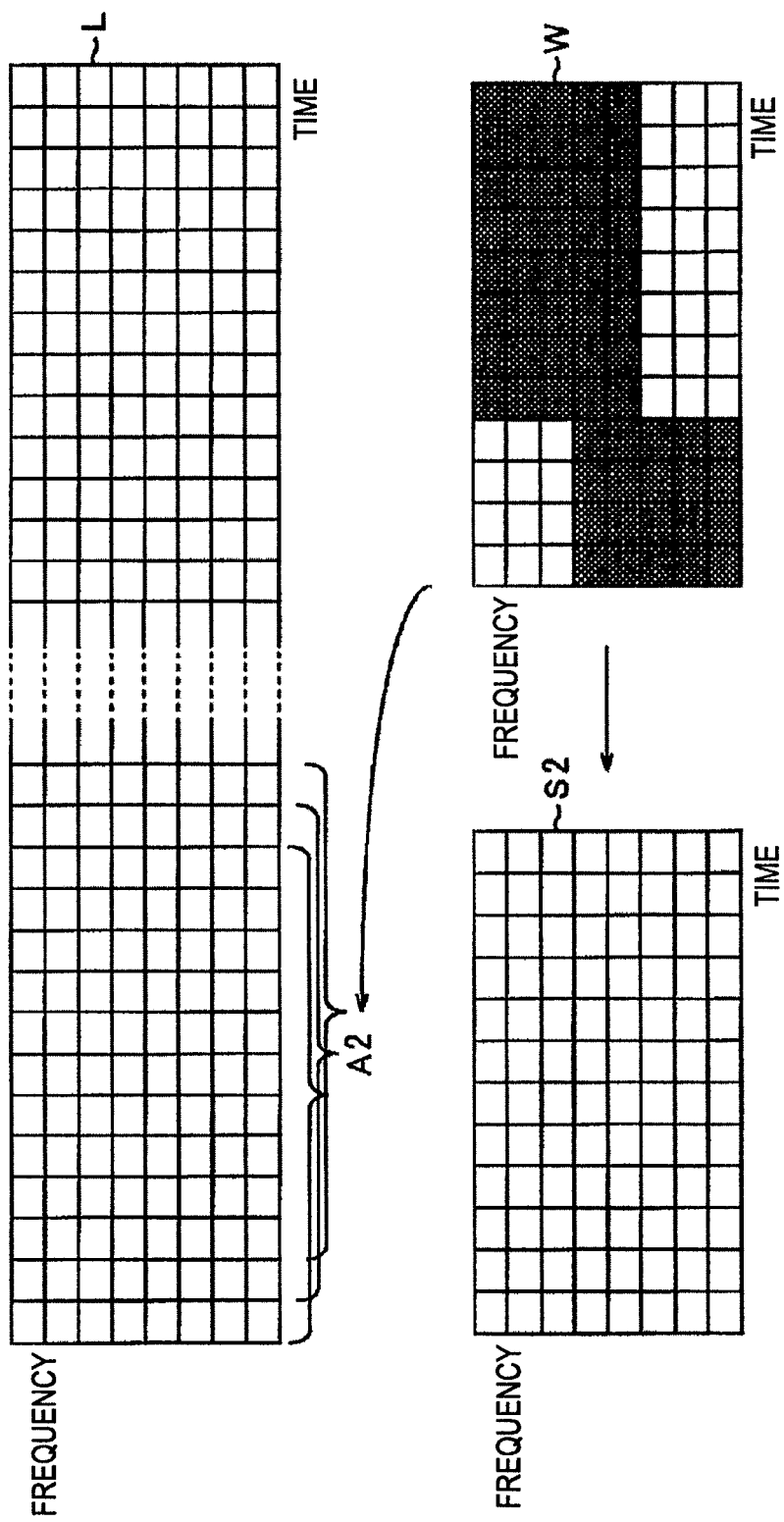
FIG. 20 is a diagram for describing a matching process between a second feature quantity of an input signal and a second feature quantity of a reference signal.

In FIG. 20, a second feature quantity L of the reference signal is illustrated in the upper portion, the second feature quantity S2 of the input signal is illustrated in a lower left portion, and the mask pattern is illustrated in the lower right portion. As described above, these can be dealt with as matrices.

As illustrated in FIG. 20, the number of components of the second feature quantity L of the reference signal in the time direction is larger than the number of components of the second feature quantity S2 of the input signal in the time direction (further, the number of components of the second feature quantity S2 of the input signal in the time direction is equal to the number of components of the mask pattern W in the time direction). Thus, when a similarity between the second feature quantity of the input signal and the second feature quantity of the reference signal is calculated, the similarity calculating unit 72 sequentially clips a partial matrix A2 which is equal in the number of components in the time direction to the second feature quantity S2 of the input signal from the second feature quantity L of the reference signal while shifting the partial matrix A2 in the time direction (in the right direction in FIG. 20) (while giving an offset in the time direction), and then calculates a similarity between the partial matrix A2 and the second feature quantity S2 of the input signal. Here, when an offset in the time direction when the partial matrix A2 is clipped is t, the mask pattern W and the first feature quantity similarity R1 can be represented by the following Formulas (10) and (11).

[Math. 10]
$$W_{f(t+u)} = S1_{fu} A1_{f(t+u)} \quad (10)$$

[Math. 11]
$$R1(t) = \frac{\sum A1_{f(t+u)} S1_{fu}}{\sqrt{\sum A1_{f(t+u)}^2 \cdot \sum S1_{fu}^2}} \quad (11)$$

Then, a similarly R(t) between the partial matrix A2 and the second feature quantity S2 of the input signal is represented by the following Formula (12) using the mask pattern W illustrated in Formula (10) and the similarity R1 of the first feature quantity illustrated in Formula (11).

[Math. 12]
$$R(t) = \frac{\sum_{W_{f(t+u)} \neq 0} W_{f(t+u)} \exp(-\alpha(A2_{f(t+u)} - S2_{fu})^2)}{\sum_{W_{f(t+u)} \neq 0} W_{f(t+u)}} R1(t) \quad (12)$$

In Formulas (10) to (12), f and u represent a frequency component and a time component of the partial matrix A2 of the second feature quantity of the reference signal and the respective matrices of the second feature quantity S2 of the input signal and the mask pattern W. In other words, A1, S1, W, A2, and S2 to which f and u are attached as additional characters represent respective elements in respective matrices A1, S1, W, A2, and S2, respectively.

The similarity R(t) illustrated in Formula (12) need not be calculated on all elements of each matrix, and it is desirable to calculate the similarity R(t) on an element (an element which is not zero (0)) in the time frequency domain, which is not masked by the mask pattern W, whereby a computational cost can be suppressed. Further, since a value of an element in the time frequency domain, which is not masked by the mask pattern W, represents musicality of each time frequency domain of the input signal and the reference signal, the similarity R(t) can be calculated such that a large weight is given to an element of the time frequency domain which is high in musicality (including only a music component). That is, the similarity can be calculated with a high degree of accuracy. Further, when all elements of the mask pattern W are zero (0), the similarity R(t) is zero (0).

In this way, the similarity calculating unit 72 calculates the similarity on all partial matrices A2 (a time offset t for clipping all partial matrices A2), and supplies a highest similarity to the comparison determining unit 73 as the similarity between the second feature quantity of the input signal and the second feature quantity of the reference signal. The comparison determining unit 73 stores the similarity from the similarity calculating unit 72 in an internal storage area.

Further, the mask pattern W is not limited to multiplication between matrix elements illustrated in Formula (10) and may be obtained by any other calculation such as a weighted geometric mean or a weighted arithmetic mean.

Furthermore, the respective elements of the mask pattern W may be subjected to a non-linear transform by a sigmoidal function or the like after a calculation between matrix elements.

Further, the first feature quantity similarity R1 is not limited to a calculation by Formula (12). For example, the first feature quantity similarity R1 may be calculated based on a difference between elements of two matrices such as a square error or an absolute error or may be a predetermined fixed value.

Further, when the second feature quantities of the input signal and the reference signal are ternarized, the similarity R(t) may be calculated using a discrete function as illustrated in the following Formulas (13) and (14).

[Math. 13]
$$R(t) = \frac{\sum_{W_{f(t+u)} \neq 0} W_{f(t+u)} I(A2_{f(t+u)}, S2_{fu})}{\sum_{W_{f(t+u)} \neq 0} W_{f(t+u)}} R1(t) \quad (13)$$

[Math. 14]
$$I(A2_{f(t+u)}, S2_{fu}) = \begin{cases} 1 & \text{if } A2_{f(t+u)} = S2_{fu} \\ 0 & \text{if } A2_{f(t+u)} \neq S2_{fu} \end{cases} \quad (14)$$

Figure 18:
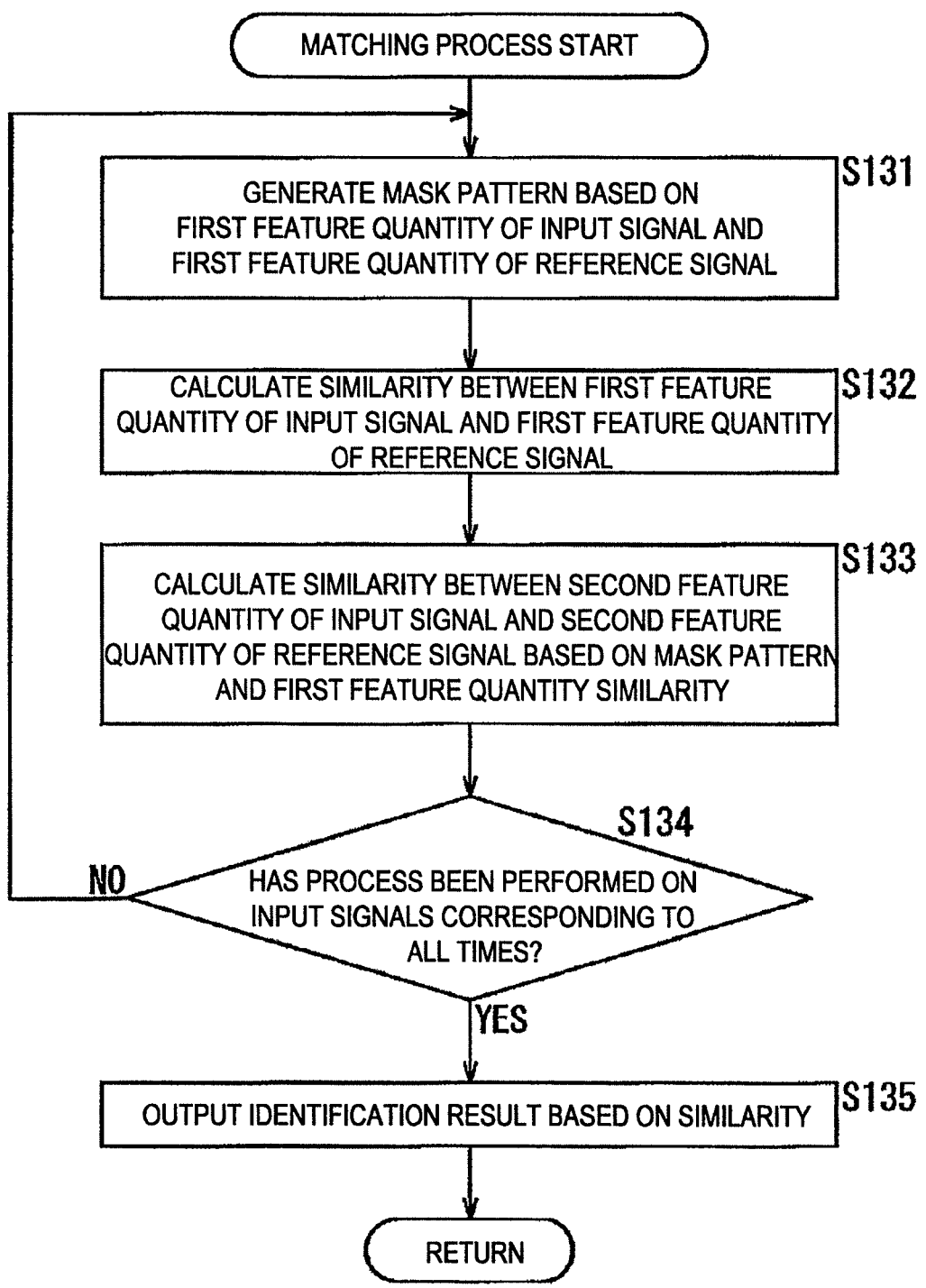
FIG. 18 is a flowchart for describing a matching process.

Returning to the flowchart of FIG. 18, in step S134, the similarity calculating unit 72 determines whether or not the similarity calculating process has been performed on the input signals corresponding to all times.

When it is determined in step S134 that the similarity calculating process has not been performed on the input signals corresponding to all times, the process returns to step S131, and the processes of steps S131 to S134 are repeated until the similarity calculating process is performed on the input signals corresponding to all times.

Then, when it is determined in step S134 that the similarity calculating process has been performed on the input signals corresponding to all times, the process proceeds to step S135. In step S135, the comparison determining unit 73 determines whether or not music included in the input signal is identical to music of the reference signal based on the similarity supplied from the similarity calculating unit 72, and outputs the music attribute information representing an attribute of music of the reference signal as the identification result.

Specifically, first, the comparison determining unit 73 arranges the similarities on the input signals corresponding to all times, which have been supplied from the similarity calculating unit 72 and then stored, in time series.

Figure 21:
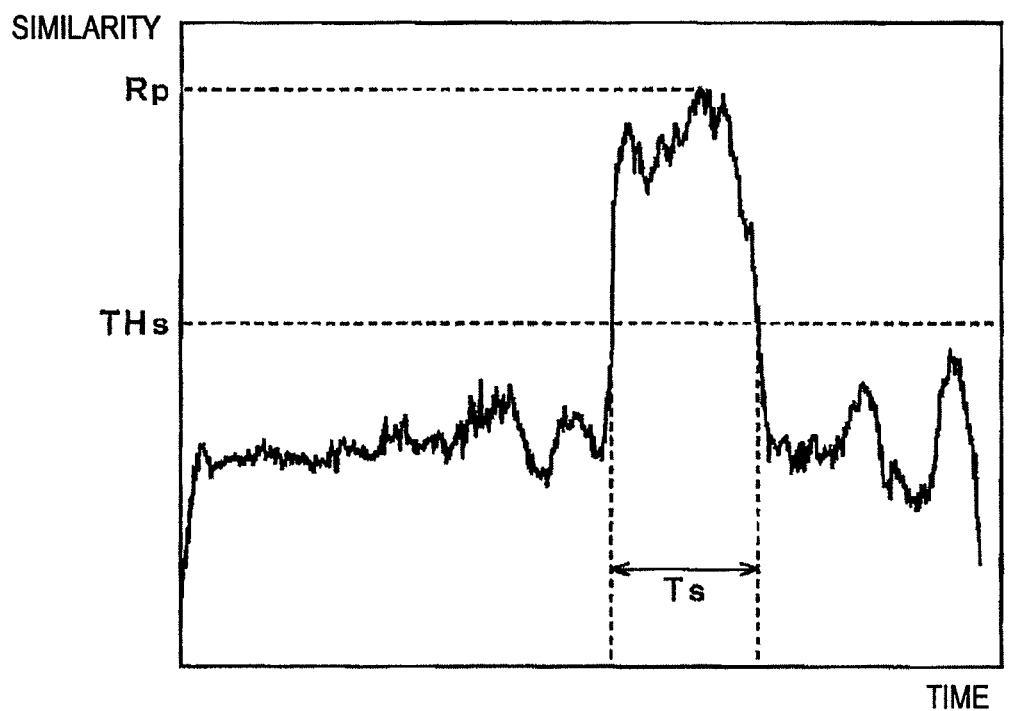
FIG. 21 is a diagram illustrating an example of similarities arranged in time series.

FIG. 21 illustrates an example of similarities arranged in time series.

The comparison determining unit 73 sets a section Ts of a similarity larger than a predetermined threshold value THs among similarities arranged in time series illustrated in FIG. 21 as a candidate section which is high in a possibility that music of the reference signal is included in the input signals corresponding to all times. Further, the comparison determining unit 73 specifies a similarity Rp which is highest in the candidate section Ts. Further, the comparison determining unit 73 obtains temporal continuity of a similarity.

Here, temporal continuity of a similarity will be described with reference to FIG. 22.

As described above, the similarity stored in the comparison determining unit 73 is a highest similarity among similarities between the matrix S2 of the feature quantity (the second feature quantity) corresponding to a predetermined time and the partial matrix A2 of the feature quantity (the second feature quantity) L of the reference signal.

Figure 22:
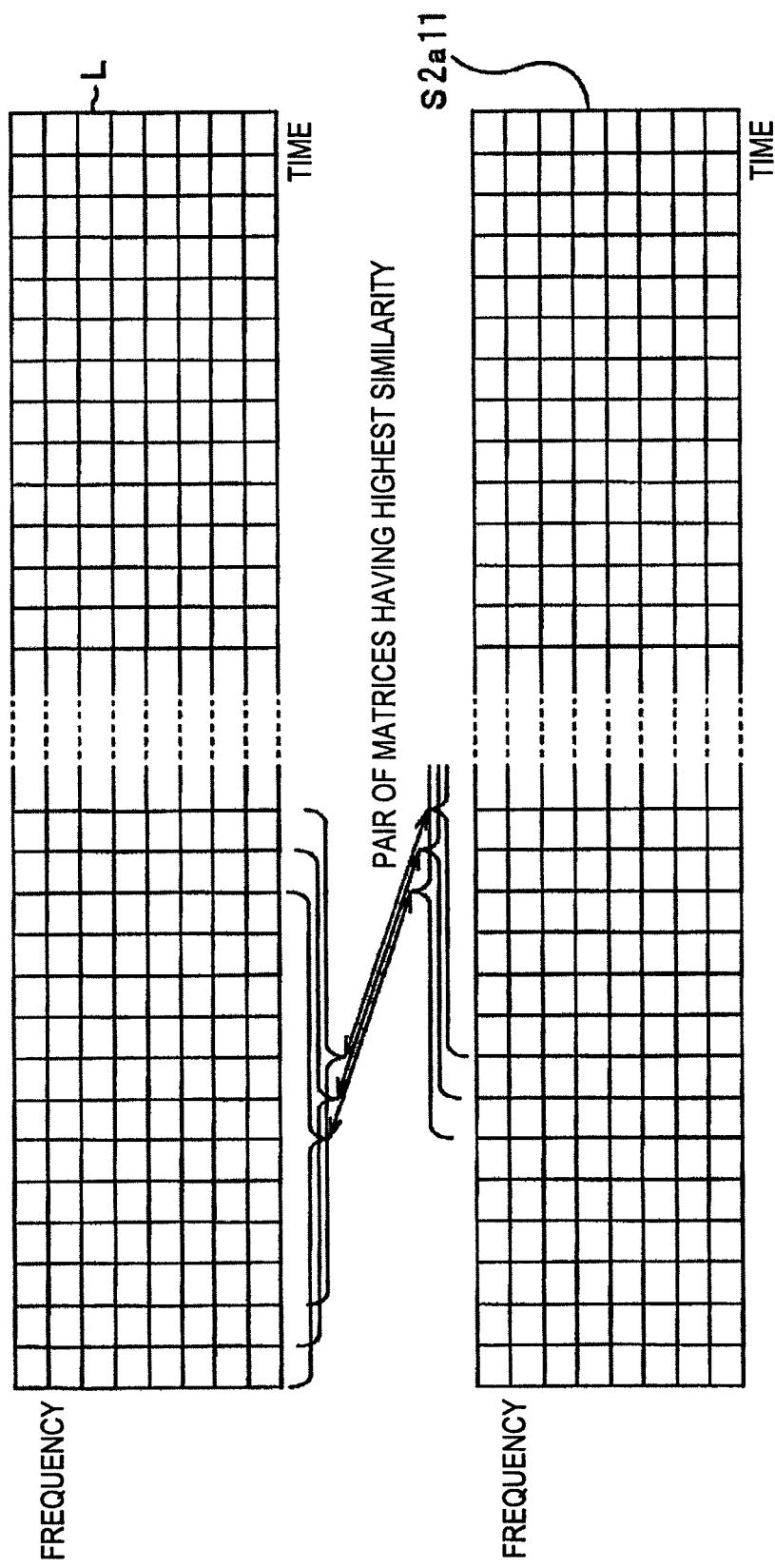
FIG. 22 is a diagram for describing temporal continuity of a similarity.
Figure 23:
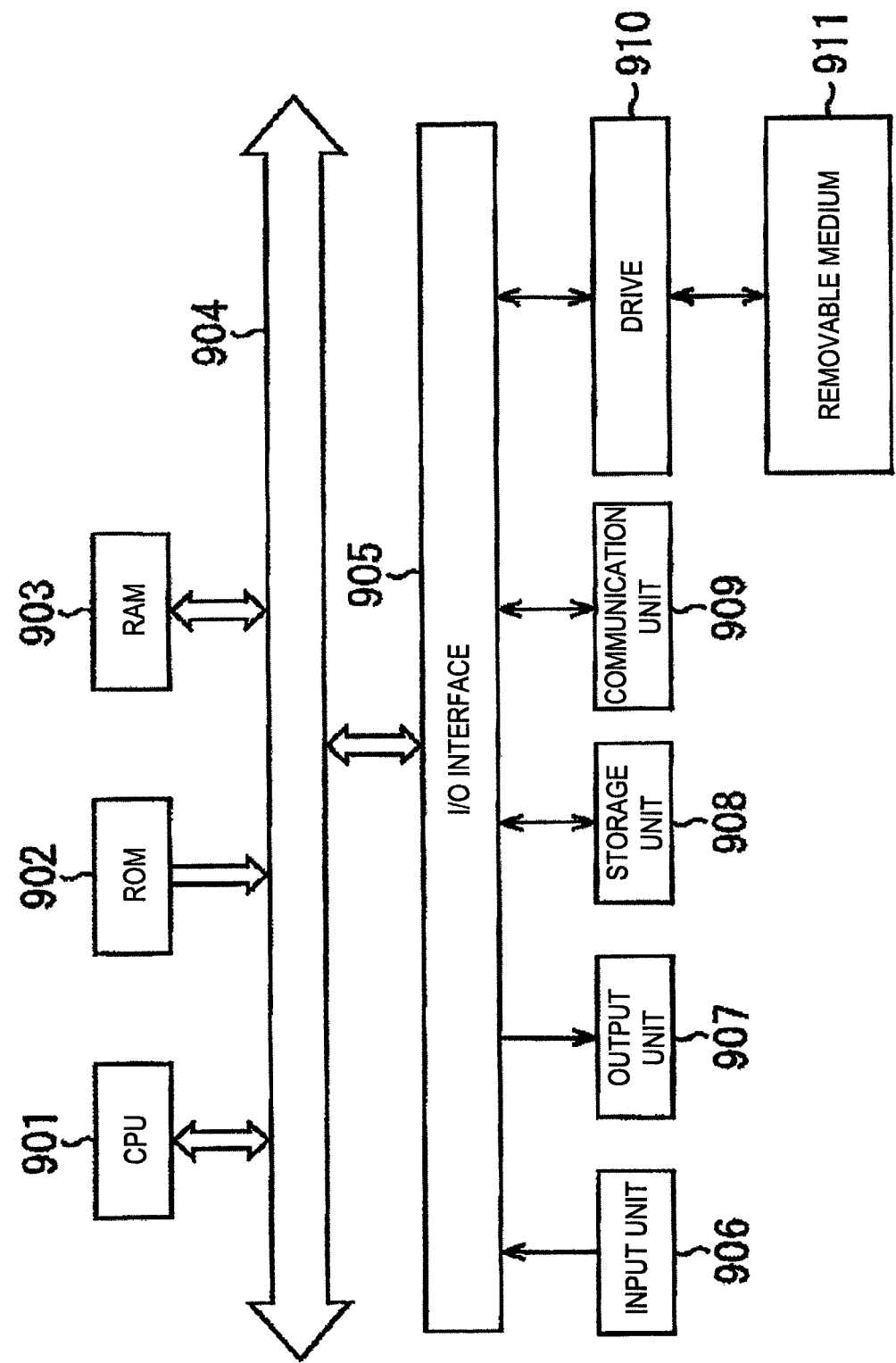
FIG. 23 is a block diagram illustrating a hardware configuration example of a computer.

Here, when a similarity is calculated on a matrix S2 all of the feature quantities of the input signals corresponding to all times, if music of the reference signal is included in some of the input signals, a pair of the matrix S2 of the feature quantity of the input signal and the partial matrix A2 of the feature quantity of the reference signal between which a similarity is highest are considered to shift in the time direction at the same time intervals as illustrated in FIG. 22. Thus, the comparison determining unit 73 uses an amount by which the pair of the matrix S2 of the feature quantity of the input signal and the partial matrix A2 of the feature quantity of the reference signal between which a similarity is highest are shifted in the time direction at the same intervals as an index of temporal continuity of a similarity.

Then, the comparison determining unit 73 determines whether or not music included in the input signal is identical to music of the reference signal using a predetermined discriminant function based on the length of the candidate section Ts, a value of the highest similarity Rp, and the index of temporal continuity of a similarity. When it is determined that music included in the input signal is identical to music of the reference signal, the comparison determining unit 73 outputs the music attribute information representing an attribute of music of the reference signal as the identification result.

However, when it is determined that music included in the input signal is not identical to music of the reference signal, the comparison determining unit 73 outputs information representing that music included in the input signal is not identical to music of the reference signal.

According to the above process, when an input signal in which music is mixed with noise is compared with a reference signal including only music, a tonality index is calculated in the input signal and the reference signal of the time frequency domain, a similarity between the feature quantity of the input signal and the feature quantity of the reference signal obtained from the index is calculated, and music of the input signal is identified based on the similarity. Since the tonality index is one in which stability of a power spectrum with respect to a time is quantified, the feature quantity obtained from the index can reliably represent musicality. Thus, a similarity can be calculated with a high degree of accuracy, and music can be identified from the input signal in which music is mixed with noise with a high degree of accuracy.

Further, the mask pattern is generated using the feature quantity of the input signal and the feature quantity of the reference signal. Thus, compared to a mask pattern generated using only the feature quantity of the input signal, the matching process can be performed by more reliably masking the input signal.

Specifically, in the case in which music having a small sound is included in an input signal, if the mask pattern generated only from the feature quantity of the input signal is used, when the sound is included in music of the reference signal, other music of the reference signal is masked, and thus it may be determined that the input signal is identical to the reference signal even though they are different music. For example, if music of only a bass (low tone) is included in the input signal, it may be determined that the input signal is identical to the reference signal based on only the fact that the progress of the bass of the music of the reference signal is similar to the progress of the bass of the music included in the input signal.

Thus, in the present technology, the mask pattern is generated based on the first feature quantity of the input signal and the first feature quantity of the reference signal, and a similarity between the first feature quantity of the input signal and the first feature quantity of the reference signal which are used for generation of the mask pattern. Thus, the matching process is performed based on the feature quantity of a sound included in both the input signal and the reference signal. Thus, a determination on whether or not the input signal is identical to the reference signal is not made based only on the fact that a sound included in the input signal is similar to a part of a sound included in the reference signal. Thus, music can be identified from the input signal in which the music is mixed with noise with a high degree of accuracy.

Further, since the matching process can be performed using the feature quantity obtained in terms of a frequency component as well as a time component, music can be identified even from an input signal in which a conversation whose interruption time is very short is included as noise as illustrated in FIG. 1 with a high degree of accuracy. Accordingly, BGM covered by actors' conversation in television broadcast such as a drama can be identified with a high degree of accuracy.

In the music identifying process described with reference to the flowchart of FIG. 7, the reference signal analyzing process is executed between the input signal analyzing process and the matching process. However, the reference signal analyzing process may be executed before the matching process is executed, may be executed before the input signal analyzing process is executed, or may be executed in parallel with the input signal analyzing process.

The present technology can be applied not only to the music search apparatus 11 illustrated in FIG. 2 but also to a network system in which information is transmitted or received via a network such as the Internet. Specifically, a terminal device such as a mobile telephone may be provided with the clipping unit 51 of FIG. 2, and a server may be provided with the configuration other than the clipping unit 51 of FIG. 2. In this case, the server may perform the music identifying process on an input signal transmitted from the terminal device via the Internet. Then, the server may transmit the identification result to the terminal device via the Internet. The terminal device may display the identification result received from the server through a display unit or the like.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2011-092987 filed in the Japan Patent Office on Apr. 19, 2011, the entire content of which is hereby incorporated by reference.

What is claimed is:

1. A music search apparatus for comparing an input signal with a reference signal comprising only music and identifying music of the input signal, the music search apparatus comprising:
a first index calculating unit configured to calculate a tonality index of a signal component of each area of the input signal transformed into a time frequency domain,
wherein the tonality index of the input signal is calculated based on intensity of the signal component and a function obtained by approximating the intensity of the signal component;
a second index calculating unit configured to calculate a tonality index of the reference signal transformed into the time frequency domain;
a similarity calculating unit configured to calculate a similarity between a feature quantity in each area of the input signal obtained based on the tonality index of the input signal and a feature quantity in each area of the reference signal obtained based on the tonality index of the reference signal; and a music identifying unit configured to identify music of the input signal based on the similarity.

2. The music search apparatus according to claim 1, wherein the first index calculating unit comprises:

a maximum point detecting unit configured to detect a point of maximum intensity of the signal component from the input signal of a predetermined time section; and an approximate processing unit configured to approximate the intensity of the signal component near the maximum point by a template function, wherein the first index calculating unit calculates the tonality index based on an error between the intensity of the signal component near the maximum point and the template function.

3. The music search apparatus according to claim 2, wherein the first index calculating unit adjusts the tonality index according to a curvature of the template function.

4. The music search apparatus according to claim 2, wherein the first index calculating unit adjusts the tonality index based on a frequency of a maximum point of the template function.

5. The music search apparatus according to claim 1, further comprising:

a weight distribution generating unit that configured to:

generate a weight distribution on each area of the input signal and the reference signal based on a first feature quantity in each area of the input signal and the first feature quantity in each area of the reference signal, and calculate a first feature quantity similarity between the first feature quantity in each area of the input signal and the first feature quantity in each area of the reference signal, wherein the similarity calculating unit calculates a similarity between a second feature quantity in each area of the input signal and the second feature quantity in each area of the reference signal based on a weight of the weight distribution and the first feature quantity similarity.

6. The music search apparatus according to claim 5, further comprising:

a first feature quantity calculating unit configured to:

calculate a time average amount of the tonality index of the input signal obtained by filtering the tonality index in a time direction as the first feature quantity; and an input signal second feature quantity calculating unit operable to calculate a time change amount of the tonality index of the input signal obtained by filtering the tonality index in the time direction as the second feature quantity.

7. The music search apparatus according to claim 1, wherein the first index calculating unit comprises:

a maximum point detecting unit configured to detect a point of maximum intensity of the signal component from the input signal of a predetermined time section; and a tone degree calculating unit configured to calculate a tone degree by quantifying the tonality index of the input signal on a spectrogram corresponding to the predetermined time section.

8. The music search apparatus according to claim 1, further comprising:

a mask pattern generating unit configured to:

generate a mask pattern for matching a second feature quantity of the input signal and a second feature quantity of the reference signal based on a first feature quantity of the input signal and a first feature quantity of the reference signal; and calculate a first feature quantity similarity, wherein the first feature quantity similarity is a similarity between the first feature quantity of the input signal the first feature quantity of the reference signal, wherein the similarity calculating unit calculates a similarity between the second feature quantity of the input signal and the second feature quantity of the reference signal based on the first feature quantity similarity.

9. A music search method for comparing an input signal with a reference signal comprising only music and identifying music of the input signal, the method comprising:

calculating a tonality index of a signal component of each area of the input signal transformed into a time frequency domain, wherein the tonality index of the input signal is calculated based on intensity of the signal component and a function obtained by approximating the intensity of the signal component;

calculating a tonality index of the reference signal transformed into the time frequency domain; and calculating a similarity between a feature quantity in each area of the input signal obtained based on the tonality index of the input signal and a feature quantity in each area of the reference signal obtained based on the tonality index of the reference signal; and identifying music of the input signal based on the similarity.

10. A non-transitory computer-readable storage medium having stored thereon, a computer program having at least one code section, the at least one code section being executable by a computer for causing the computer to perform steps comprising:

calculating a tonality index of a signal component of each area of an input signal transformed into a time frequency domain, wherein the tonality index of the input signal is calculated based on intensity of the signal component and a function obtained by approximating the intensity of the signal component;

calculating a tonality index of a reference signal transformed into the time frequency domain; and calculating a similarity between a feature quantity in each area of the input signal obtained based on the tonality index of the input signal and a feature quantity in each area of the reference signal obtained based on the tonality index of the reference signal; and identifying music of the input signal based on the similarity.

* * * * *